US010231263B2

(12) United States Patent
Koc et al.

(10) Patent No.: US 10,231,263 B2
(45) Date of Patent: Mar. 12, 2019

(54) COORDINATION TECHNIQUES FOR DISCONTINUOUS RECEPTION (DRX) OPERATIONS IN DUAL-CONNECTIVITY ARCHITECTURES

(71) Applicant: INTEL CORPORATION, Santa Clara, CA (US)

(72) Inventors: Ali T. Koc, Portland, OR (US); Satish C. Jha, Hillsboro, OR (US); Kathiravetpillai Sivanesan, Portland, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 56 days.

(21) Appl. No.: 15/026,548

(22) PCT Filed: Nov. 28, 2014

(86) PCT No.: PCT/US2014/067824
§ 371 (c)(1),
(2) Date: Mar. 31, 2016

(87) PCT Pub. No.: WO2015/081322
PCT Pub. Date: Jun. 4, 2015

(65) Prior Publication Data
US 2016/0249405 A1 Aug. 25, 2016

Related U.S. Application Data

(60) Provisional application No. 61/909,938, filed on Nov. 27, 2013.

(51) Int. Cl.
*H04W 4/00* (2018.01)
*H04W 74/04* (2009.01)
(Continued)

(52) U.S. Cl.
CPC .......... *H04W 74/04* (2013.01); *H04B 7/2621* (2013.01); *H04L 1/0026* (2013.01);
(Continued)

(58) Field of Classification Search
None
See application file for complete search history.

(56) References Cited

U.S. PATENT DOCUMENTS

2012/0281600 A1  11/2012  Tseng et al.
2013/0107727 A1*  5/2013  Lunden ............ H04W 52/0251
                                                                  370/252

(Continued)

FOREIGN PATENT DOCUMENTS

CN      101473563 A    7/2009
CN      101483858 A    7/2009
WO      2013-169046 A1  11/2013

OTHER PUBLICATIONS

International Search Report dated Mar. 13, 2015 in International Patent Application No. PCT/US2014/067824.
(Continued)

*Primary Examiner* — Anh Vu H Ly

(57) ABSTRACT

Coordination techniques for discontinuous reception (DRX) operations in dual-connectivity architectures are described. In one embodiment, for example, user equipment (UE) may comprise logic, at least a portion of which is in hardware, the logic to receive a radio resource control (RRC) configuration message during operation in a dually-connected UE state, determine whether UE assistance information reporting is enabled for the UE based on the RRC configuration message, and in response to a determination that UE assistance information reporting is enabled for the UE, send one or more UE assistance information messages to report a macro
(Continued)

cell power preference and a small cell power preference. Other embodiments are described and claimed.

13 Claims, 11 Drawing Sheets

(51) Int. Cl.

| | |
|---|---|
| H04L 5/00 | (2006.01) |
| H04L 5/14 | (2006.01) |
| H04W 72/04 | (2009.01) |
| H04W 52/02 | (2009.01) |
| H04L 1/18 | (2006.01) |
| H04L 29/08 | (2006.01) |
| H04W 40/30 | (2009.01) |
| H04L 12/825 | (2013.01) |
| H04W 28/02 | (2009.01) |
| H04W 16/14 | (2009.01) |
| H04B 7/26 | (2006.01) |
| H04L 27/26 | (2006.01) |
| H04W 72/02 | (2009.01) |
| H04L 1/00 | (2006.01) |
| H04W 76/28 | (2018.01) |
| H04W 76/27 | (2018.01) |
| H04L 29/06 | (2006.01) |
| H04W 36/00 | (2009.01) |
| H04W 88/06 | (2009.01) |
| H04W 88/10 | (2009.01) |
| H04W 84/12 | (2009.01) |
| H04W 80/06 | (2009.01) |

(52) U.S. Cl.
CPC .......... *H04L 1/1825* (2013.01); *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01); *H04L 47/25* (2013.01); *H04L 69/161* (2013.01); *H04L 69/163* (2013.01); *H04L 69/321* (2013.01); *H04L 69/324* (2013.01); *H04L 69/326* (2013.01); *H04W 16/14* (2013.01); *H04W 28/0205* (2013.01); *H04W 36/0069* (2018.08); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0413* (2013.01); *H04W 72/0446* (2013.01); *H04W 72/0453* (2013.01); *H04W 76/27* (2018.02); *H04W 76/28* (2018.02); *H04W 36/0083* (2013.01); *H04W 80/06* (2013.01); *H04W 84/12* (2013.01); *H04W 88/06* (2013.01); *H04W 88/10* (2013.01); *Y02D 50/00* (2018.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/24* (2018.01)

(56) References Cited

U.S. PATENT DOCUMENTS

| | | | |
|---|---|---|---|
| 2013/0301500 A1 | 11/2013 | Koc et al. | |
| 2013/0343252 A1* | 12/2013 | Chakraborty | H04W 52/0261 370/311 |
| 2014/0036750 A1* | 2/2014 | Yavuz | H04W 52/0216 370/311 |
| 2014/0211673 A1* | 7/2014 | Lu | H04W 52/0212 370/311 |
| 2015/0004995 A1* | 1/2015 | Koc | H04B 7/0452 455/454 |
| 2015/0215830 A1* | 7/2015 | Dalsgaard | H04W 36/0094 455/444 |
| 2015/0319667 A1* | 11/2015 | Dalsgaard | H04W 24/10 455/444 |
| 2016/0050652 A1* | 2/2016 | Wu | H04L 5/001 370/329 |
| 2016/0295462 A1* | 10/2016 | Lunden | H04W 36/0055 370/328 |
| 2017/0295546 A1* | 10/2017 | Young | H04W 76/046 370/328 |
| 2017/0353989 A1* | 12/2017 | Kim | H04L 5/0053 370/328 |

OTHER PUBLICATIONS

ZTE, "Introduction of 'Power preference indication' (option a + RRC signaling)", Aug. 7, 2012, "R2-123414", 3GPP TSG-RAN WG2 Meeting #79, Qingdao, China, pp. 1-18.
ZTE, "Summary of email discussion [78#43] LTE/EDDA: Power preference indication", Aug. 7, 2012, "R2-123413", 3GPP TSG-RAN WG2 Meeting #79, Qingdao, China, pp. 1-21.
Extended European Search Report received for European patent Application No. 14865415.5, dated Jun. 7, 2017, 8 pages.
"Introduction of 'Power preference indication'", 3GPP Draft, ZTE Corporation, R2-124364, Sep. 9, 2012, 18 pages, author unknown.
"TP related to e-mail discussion [82#17][LTE/SCI-HL] Control Plane aspects", 3GPP Draft, Ericsson (Rapporteur), R2-132692, Aug. 10, 2013, 3 pages, author unknown.

* cited by examiner

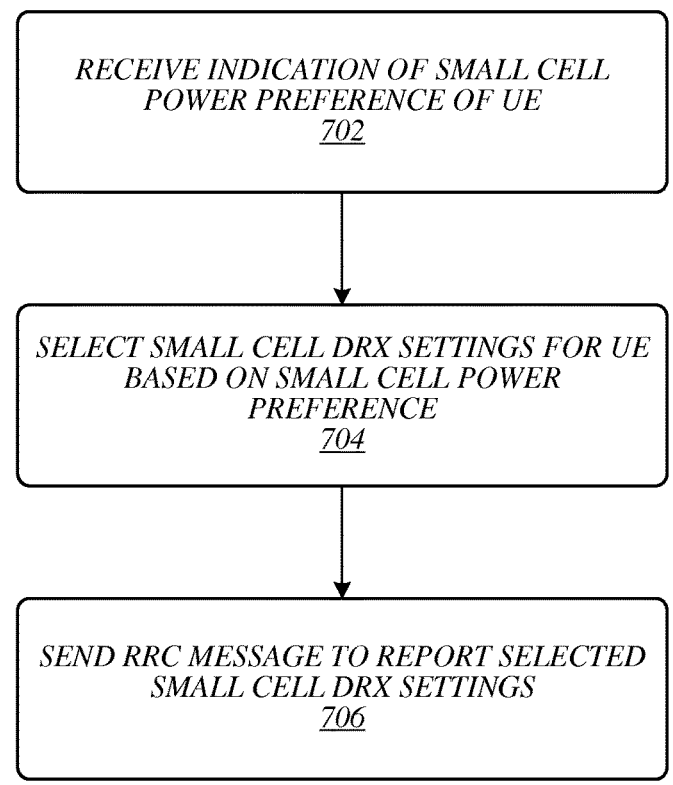

```
-- ASN1START

UEAssistanceInformation-r11 ::=           SEQUENCE {
    criticalExtensions                    CHOICE {
        c1                                CHOICE {
            ueAssistanceInformation-r11       UEAssistanceInformation-r11-IEs,
            spare3 NULL, spare2 NULL, spare1 NULL
        },
        criticalExtensionsFuture          SEQUENCE {}
    }
}
                                                                              ┌─ 802
UEAssistanceInformation-r11-IEs ::=       SEQUENCE {
    powerPrefIndication-r11               ENUMERATED {normal, lowPowerConsumption}
OPTIONAL,
    nonCriticalExtension                  UEAssistanceInformation-r12-IEs OPTIONAL
}                                                                             ┌─ 804
UEAssistanceInformation-r12-IEs ::=       SEQUENCE {
    powerPrefIndicationSeNB-r12           ENUMERATED {normal, lowPowerConsumption}
OPTIONAL, lateNonCriticalExtension              OCTET STRING                    OPTIONAL,
    nonCriticalExtension                  SEQUENCE {}                     OPTIONAL
}

-- ASN1STOP
```

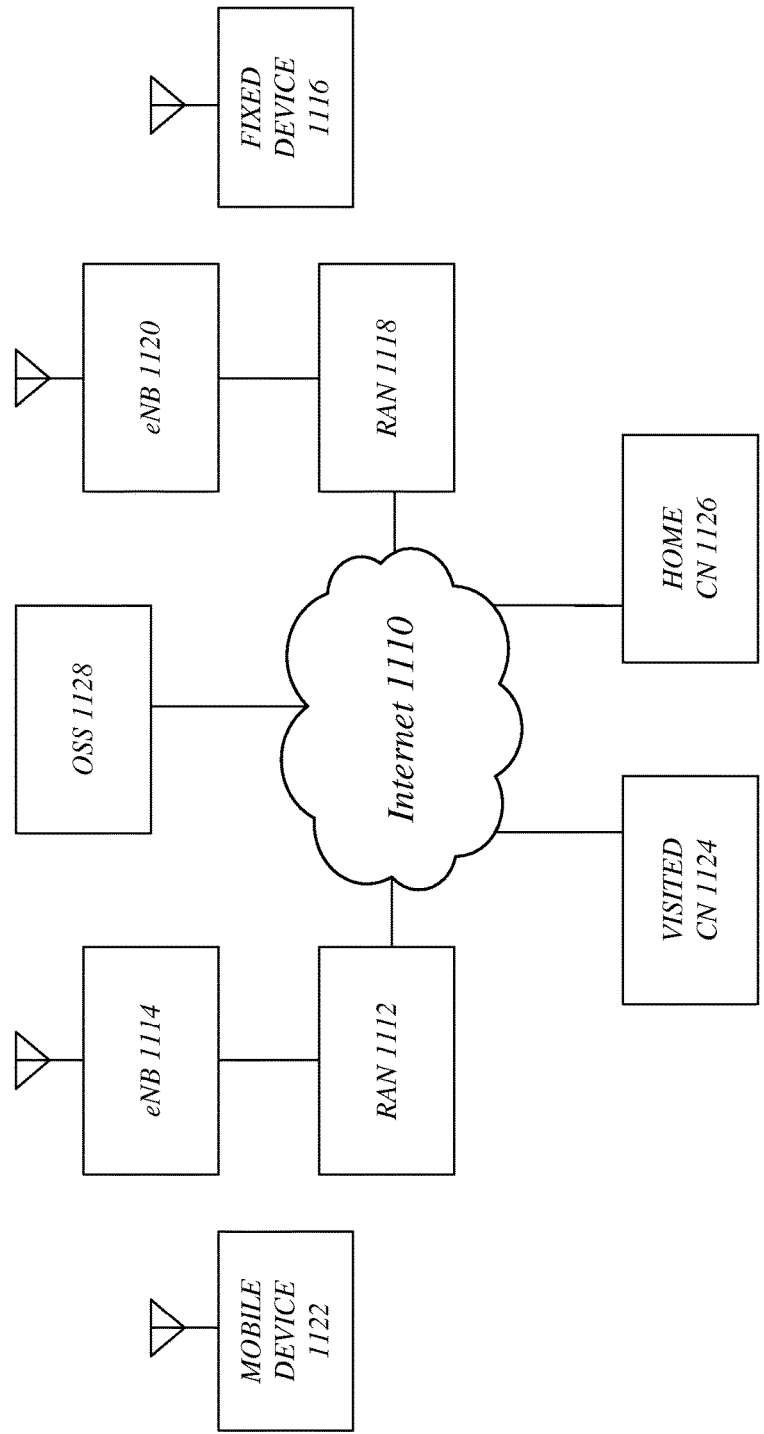

ial Patent
COORDINATION TECHNIQUES FOR DISCONTINUOUS RECEPTION (DRX) OPERATIONS IN DUAL-CONNECTIVITY ARCHITECTURES

RELATED CASE

This application claims priority to U.S. Provisional Patent Application No. 61/909,938, filed Nov. 27, 2013, the entirety of which is hereby incorporated by reference.

TECHNICAL FIELD

Embodiments herein generally relate to communications between devices in broadband wireless communications networks.

BACKGROUND

In an evolved universal mobile telecommunications system (UMTS) terrestrial radio access network (E-UTRAN), a user equipment (UE) that has established data connectivity with an evolved node B (eNB) may operate in a discontinuous reception (DRX) mode. While operating in the DRX mode, the UE may disable its receiver and enter a low power state during some time periods, in order to conserve power. The frequencies and durations of the periods during which the UE enters the low power state may be specified by DRX settings that the UE receives from the eNB. The eNB may send DRX settings to the UE in response to receipt of a power preference indicator (PPI) indicating that the UE prefers a low power mode of operation.

In a E-UTRAN that supports dual-connectivity, a UE may be able to establish concurrent data connectivity with a master evolved node B (MeNB) and a secondary evolved node B (SeNB). In order to provide increased flexibility with respect to power conservation, it may be desirable that such a UE be provided with the ability to express distinct power preferences regarding respective communications with the MeNB and SeNB.

BRIEF DESCRIPTION OF THE DRAWINGS

FIG. 7 illustrates an embodiment of a third logic flow.
FIG. 8 illustrates an embodiment of a message.
FIG. 11 illustrates an embodiment of a wireless network.

DETAILED DESCRIPTION

Figure 1:
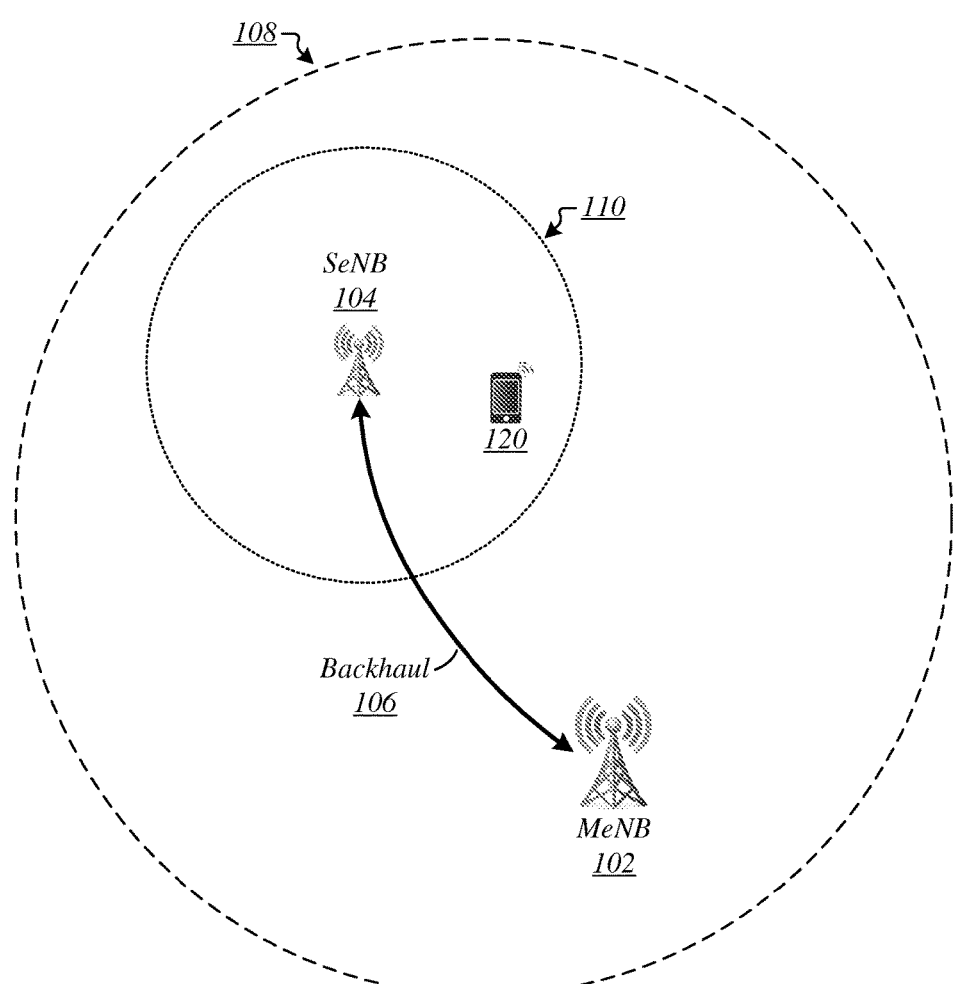
FIG. 1 illustrates an embodiment of an operating environment.

Various embodiments may be generally directed to coordination techniques for discontinuous reception (DRX) operations in dual-connectivity architectures. In one embodiment, for example, user equipment (UE) may comprise logic, at least a portion of which is in hardware, the logic to receive a radio resource control (RRC) configuration message during operation in a dually-connected UE state, determine whether UE assistance information reporting is enabled for the UE based on the RRC configuration message, and in response to a determination that UE assistance information reporting is enabled for the UE, send one or more UE assistance information messages to report a macro cell power preference and a small cell power preference. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 such as may be representative of various embodiments. In the example operating environment 100 of FIG. 1, an MeNB 102 communicates with an SeNB 104 via a backhaul 106. In some embodiments, backhaul 106 may comprise a backhaul that is categorized as being non-ideal according to 3GPP TR 36.932 ver. 12.1.0 (released March 2013), and/or according to any predecessors, revisions, progeny, and/or variants thereof. SeNB 104 may generally provide wireless service within a small cell 110, and MeNB 102 may generally provide wireless service within an overlaid macro cell 108. In example operating environment 100, a UE 120 resides at a position located within small cell 110, and that position is also located within the overlaid macro cell 108.

In various embodiments, UE 120 may wirelessly communicate with MeNB 102 and/or SeNB 104 according to a set of wireless communications specifications, such as 3GPP Release 12 (Rel-12). In some embodiments, based on the set of wireless communications specifications, UE 120 may be configured with the capability of entering into a dual-connectivity mode of operation, according to which the UE 120 is provided with concurrent data connectivity to both MeNB 102 and SeNB 104. During dual-connectivity operation in various embodiments, UE 120 may be provided with data connectivity to MeNB 102 via a first data connection that utilizes a first wireless communication frequency, and may concurrently be provided with data connectivity to SeNB 104 via a second data connection that utilizes a second wireless communication frequency.

In some embodiments, the set of wireless communications specifications may stipulate that UE 120 is to possess a single radio resource control (RRC) state that applies to both MeNB 102 and SeNB 104. In various embodiments, for example, UE 120 may be permitted either to be in an RRC_Connected state with respect to both MeNB 102 and SeNB 104 or to be in an RRC_Idle state with respect to both MeNB 102 and SeNB 104, but not permitted to be in an RRC_Connected state with respect to one while being in an RRC_Idle state with respect to the other. In some embodiments, according to the set of wireless communication specifications, MeNB 102 may be responsible for transmitting RRC messages to UE 120 in conjunction with management of the RRC state of UE 120. In various embodiments, the set of wireless communications specifications may not support transmission of RRC messages on the part of SeNB 104.

In various embodiments, according to the set of wireless communication specifications, UE 120 may be configured with the capability of recognizing and observing distinct DRX states and/or different sets of DRX parameters with respect to receipt of transmissions from MeNB 102 and SeNB 104, respectively. For example, in some embodiments, UE 120 may be capable of operating in a DRX mode with respect to MeNB 102 while operating in a non-DRX mode with respect to SeNB 104. In another example, in various embodiments, UE 120 may be capable of observing a first set of DRX parameters in conjunction with DRX-mode operation with respect to MeNB 102, and observing a second set of DRX parameters in conjunction with DRX-mode operation with respect to SeNB 104. In order that UE 120 be provided with the ability to capitalize on this flexibility and tailor its power conservation efforts to match its expected usage of its respective data connections with MeNB 102 and SeNB 104, it may be desirable that UE 120 be configurable to select and report separate PPIs for MeNB 102 and SeNB 104.

Disclosed herein are coordination techniques for DRX operations in dual-connectivity architectures. According to some such techniques, a UE may be configured to report a master PPI to an MeNB and to report a secondary PPI to an SeNB, either directly or via the MeNB. The MeNB may select macro cell DRX settings for the UE based on the master PPI, and the SeNB may select small cell DRX settings for the UE based on the secondary PPI. The SeNB may forward the small cell DRX settings that it selects to the MeNB, and the MeNB may send both the macro cell DRX settings and the small cell DRX settings to the UE. The embodiments are not limited in this context.

Figure 2:
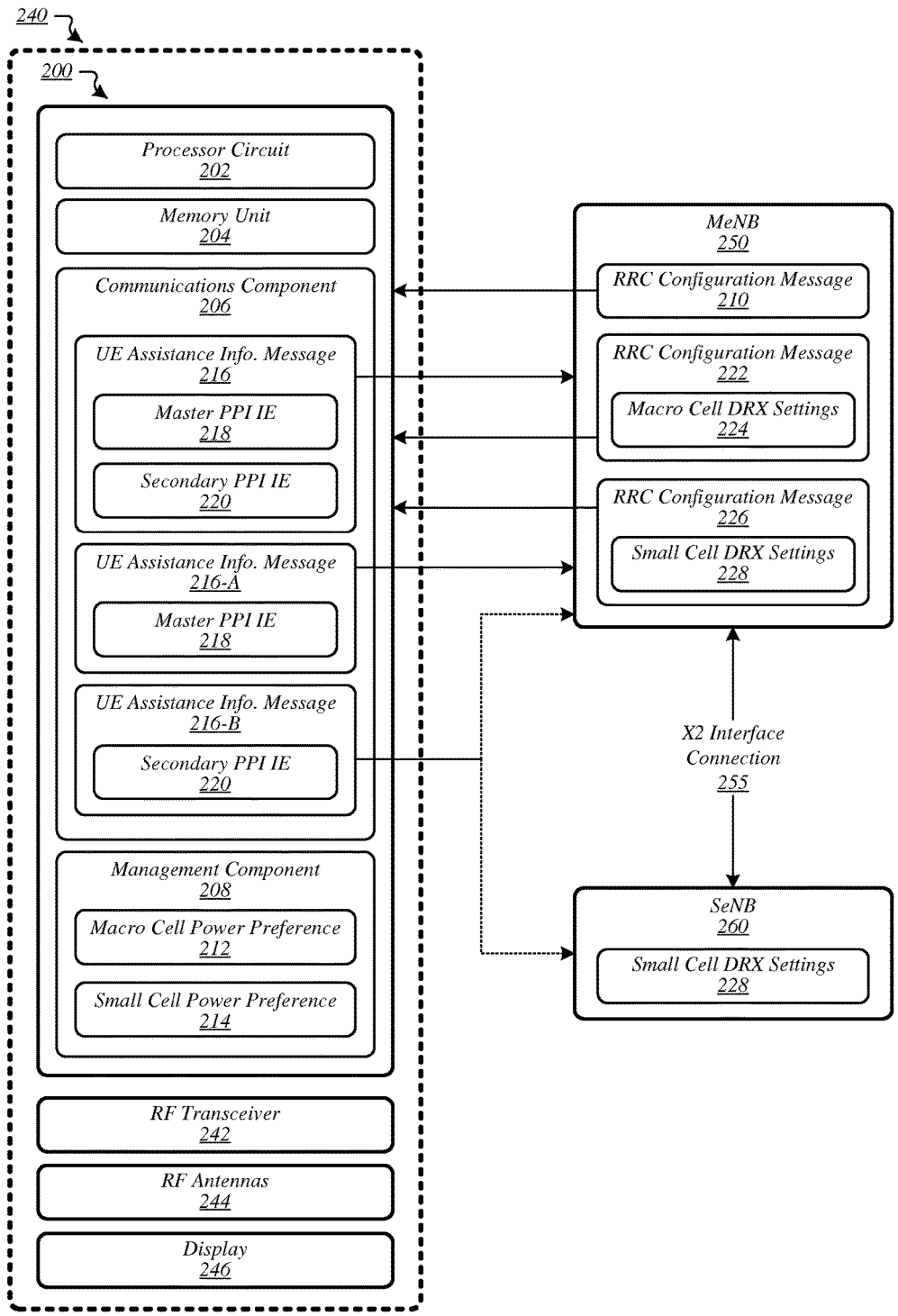
FIG. 2 illustrates an embodiment of a first apparatus and an embodiment of a first system.

FIG. 2 illustrates a block diagram of an apparatus 200 that may implement coordination techniques for DRX operations in dual-connectivity architectures in various embodiments. For example, apparatus 200 may be representative of UE 120 of FIG. 1 in some embodiments. As shown in FIG. 2, apparatus 200 comprises multiple elements including a processor circuit 202, a memory unit 204, a communications component 206, and a management component 208. The embodiments, however, are not limited to the type, number, or arrangement of elements shown in this figure.

In various embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In some embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in various embodiments. The embodiments are not limited in this context.

In some embodiments, apparatus 200 may comprise a communications component 206. Communications component 206 may comprise logic, circuitry, and/or instructions operative to send messages to one or more remote devices and/or to receive messages from one or more remote devices. In various embodiments, communications component 206 may be operative to send and/or receive messages over one or more wired connections, one or more wireless connections, or a combination of both. In some embodiments, communications component 206 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 200 may comprise a management component 208. Management component 208 may comprise logic, circuitry, and/or instructions operative to manage the connectivity state, transmission and/or reception activities, and/or other operations of apparatus 200. In various embodiments, management component 208 may be configured to perform various determinations, decisions, selections, operations, and/or actions in conjunction with such management. In some embodiments, management component 208 may be configured to manage the connectivity state, transmission and/or reception activities, and/or other operations of apparatus 200 based on one or more control message, commands, notifications, packets, or other communications received from one or more external control nodes. The embodiments are not limited in this context.

FIG. 2 also illustrates a block diagram of a system 240. System 240 may comprise any of the aforementioned elements of apparatus 200. System 240 may further comprise a radio frequency (RF) transceiver 242. RF transceiver 242 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 242 may operate in accordance with one or more applicable standards in any version. The embodiments are not limited in this context.

In various embodiments, system 240 may comprise one or more RF antennas 244. Examples of any particular RF antenna 244 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 242 may be operative to send and/or receive messages and/or data using one or more RF antennas 244. The embodiments are not limited in this context.

In various embodiments, system 240 may comprise a display 246. Display 246 may comprise any display device capable of displaying information received from processor circuit 202. In some embodiments, display 246 may comprise a touch-sensitive display screen ("touchscreen"). In various embodiments, display 246 may comprise a monitor, a computer screen, a television, a projector, or another type of display device. In some embodiments, display 246 may be implemented by a liquid crystal display (LCD), light emitting diode (LED) or other type of suitable visual interface. In various embodiments, display 246 may comprise an LCD that includes one or more thin-film transistors (TFTs). The embodiments are not limited in this context.

In some embodiments, during general operation, apparatus 200 and/or system 240 may be operative to establish dual connectivity with an MeNB 250 and an SeNB 260. In various embodiments, SeNB 260 may generally provide wireless service within a small cell, and MeNB 250 may generally provide wireless service within a macro cell that is overlaid upon that small cell. In some embodiments, MeNB 250 may be the same as—or similar to—MeNB 102 of FIG. 1, and SeNB 260 may be the same as—or similar to—SeNB 104 of FIG. 1. In various embodiments, MeNB 250 and SeNB 260 may communicate over an X2 interface connection 255. In some embodiments, X2 interface connection 255 may be implemented using a backhaul that is the same as—or similar to—backhaul 106 of FIG. 1. In various embodiments, X2 interface connection 255 may be implemented using a non-ideal backhaul. The embodiments are not limited in this context.

In some embodiments, while operating in a dually-connected state according to which it has concurrent data connectivity with MeNB 250 and SeNB 260, apparatus 200 and/or system 240 may be operative to receive an RRC configuration message 210 from MeNB 250. In various embodiments, RRC configuration message 210 may comprise an RRCConnectionReconfiguration message. In some embodiments, RRC configuration message 210 may comprise an indication of whether UE assistance information reporting is enabled for apparatus 200 and/or system 240. In various embodiments, RRC configuration message 210 may comprise a powerPrefIndicationConfig field that contains a value indicating whether UE assistance information reporting is enabled for apparatus 200 and/or system 240. In some embodiments, RRC configuration message 210 may comprise an RRCConnectionReconfiguration message containing an otherConfig information element (IE) that in turn contains such a powerPrefIndicationConfig field. In various embodiments, management component 208 may be operative to determine whether UE assistance information reporting is enabled for apparatus 200 and/or system 240 based on RRC configuration message 210. In some embodiments, management component 208 may be operative to determine whether UE assistance information reporting is enabled for apparatus 200 and/or system 240 based on a value contained in a field comprised in RRC configuration message 210. For example, in various embodiments, management component 208 may be operative to determine whether UE assistance information reporting is enabled for apparatus 200 and/or system 240 based on a value contained in a powerPrefIndicationConfig field comprised in RRC configuration message 210. The embodiments are not limited to this example.

In some embodiments, in response to a determination that UE assistance information reporting is enabled for apparatus 200 and/or system 240, management component 208 may be operative to determine a macro cell power preference 212 and a small cell power preference 214. In various embodiments, macro cell power preference 212 may comprise a preference regarding power consumption with respect to communications with MeNB 250, and small cell power preference 214 may comprise a preference regarding power consumption with respect to communications with SeNB 260. In some embodiments, with respect to communications with MeNB 250, macro cell power preference 212 may comprise either a preference for a configuration that is primarily optimized for power savings or a preference for a normal configuration. Likewise, in various embodiments, with respect to communications with SeNB 260, small cell power preference 214 may comprise either a preference for a configuration that is primarily optimized for power savings or a preference for a normal configuration. The embodiments are not limited in this context.

In some embodiments, communications component 206 may be operative to send one or more UE assistance information messages to report macro cell power preference 212 and small cell power preference 214 to MeNB 250 and SeNB 260. In various embodiments, the one or more UE assistance information messages may collectively comprise a master power preference indication (PPI) IE 218 and a secondary PPI IE 220. In some embodiments, master PPI IE 218 may comprise an indication of the macro cell power preference 212 of apparatus 200 and/or system 240, and secondary PPI IE 220 may comprise an indication of the small cell power preference 214 of apparatus 200 and/or system 240. In various embodiments, master PPI IE 218 and secondary PPI IE 220 may each comprise either a value indicating a preference for a configuration that is primarily optimized for power savings or a value indicating a preference for a normal configuration. In some such embodiments, master PPI IE 218 and secondary PPI IE 220 may each comprise either a lowPowerConsumption value indicating a preference for a configuration that is primarily optimized for power savings or a normal value indicating a preference for a normal configuration. The embodiments are not limited in this context.

In various embodiments, communications component 206 may be operative to send a single UE assistance information message 216 in order to report macro cell power preference 212 and small cell power preference 214 to MeNB 250 and SeNB 260. In some such embodiments, the single UE assistance information message 216 may comprise master PPI IE 218 and secondary PPI IE 220. In various embodiments, communications component 206 may be operative to send the single UE assistance information message 216 to MeNB 250. In some embodiments, MeNB 250 may be operative to identify the small cell power preference 214 of apparatus 200 and/or system 240 based on information comprised in the single UE assistance information message 216. In various embodiments, MeNB 250 may be operative to report the small cell power preference 214 of apparatus 200 and/or system 240 to SeNB 260. In some such embodiments, MeNB 250 may be operative to report the small cell power preference 214 of apparatus 200 and/or system 240 to SeNB 260 by sending a message to SeNB 260 over X2 interface connection 255. The embodiments are not limited in this context.

In various embodiments, communications component 206 may be operative to send multiple UE assistance information messages in order to report macro cell power preference 212 and small cell power preference 214 to MeNB 250 and SeNB 260. In some embodiments, communications component 206 may be operative to send a UE assistance information message 216-A to report macro cell power preference 212 and may be operative to send a UE assistance information message 216-B to report small cell power preference 214. In various embodiments, UE assistance information message 216-A may comprise master PPI IE 218, and UE assistance information message 216-B may comprise secondary PPI IE 220. In some embodiments, communications component 206 may be operative to send UE assistance information message 216-A to MeNB 250, and may be operative to send UE assistance information message 216-B to SeNB 260. In various other embodiments, communications component 206 may be operative to send both UE assistance information message 216-A and UE assistance information message 216-B to MeNB 250. In some such embodiments, MeNB 250 may be operative to identify the small cell power preference 214 of apparatus 200 and/or system 240 based on information comprised in UE assistance information message 216-B. In various embodiments, MeNB 250 may be operative to report the small cell power preference 214 of apparatus 200 and/or system 240 to SeNB 260. In some such embodiments, MeNB 250 may be operative to report the small cell power preference 214 of apparatus 200 and/or system 240 to SeNB 260 by sending a message to SeNB 260 over X2 interface connection 255. The embodiments are not limited in this context.

In various embodiments, communications component 206 may be operative to receive macro cell DRX settings 224 and small cell DRX settings 228 in response to one or more UE assistance information messages that it sends to report macro cell power preference 212 and small cell power preference 214. In some embodiments, macro cell DRX settings 224 may comprise DRX settings applicable to communications between MeNB 250 and apparatus 200 and/or system 240, and small cell DRX settings 228 may comprise DRX settings applicable to communications between SeNB 260 and apparatus 200 and/or system 240. In various embodiments, apparatus 200 and/or system 240 may be operative configure its communications with MeNB 250 based on macro cell DRX settings 224, and may be operative to configure its communications with SeNB 260 based on small cell DRX settings 228. In some embodiments, apparatus 200 and/or system 240 may be operative to monitor control channels of the macro cell and small cell in accordance with the received macro cell DRX settings 224 and small cell DRX settings 228 received from MeNB 250.

In various embodiments, communications component 206 may be operative to receive macro cell DRX settings 224 and small cell DRX settings 228 from MeNB 250. In some embodiments, SeNB 260 may be operative to send small cell DRX settings 228 to MeNB 250, and MeNB 250 may then be operative to send small cell DRX settings 228 to apparatus 200 and/or system 240. In various embodiments, communications component 206 may be operative to receive an RRC configuration message 222 that comprises macro cell DRX settings 224 and may be operative to receive an RRC configuration message 226 that comprises small cell DRX settings 228. In some embodiments, RRC configuration messages 222 and 226 may comprise RRCConnectionReconfiguration messages. In various embodiments, rather than receiving macro cell DRX settings 224 and small cell DRX settings 228 in separate messages, communications component 206 may be operative to receive a single message from MeNB 250 that comprises macro cell DRX settings 224 and small cell DRX settings 228. The embodiments are not limited in this context.

Figure 3:
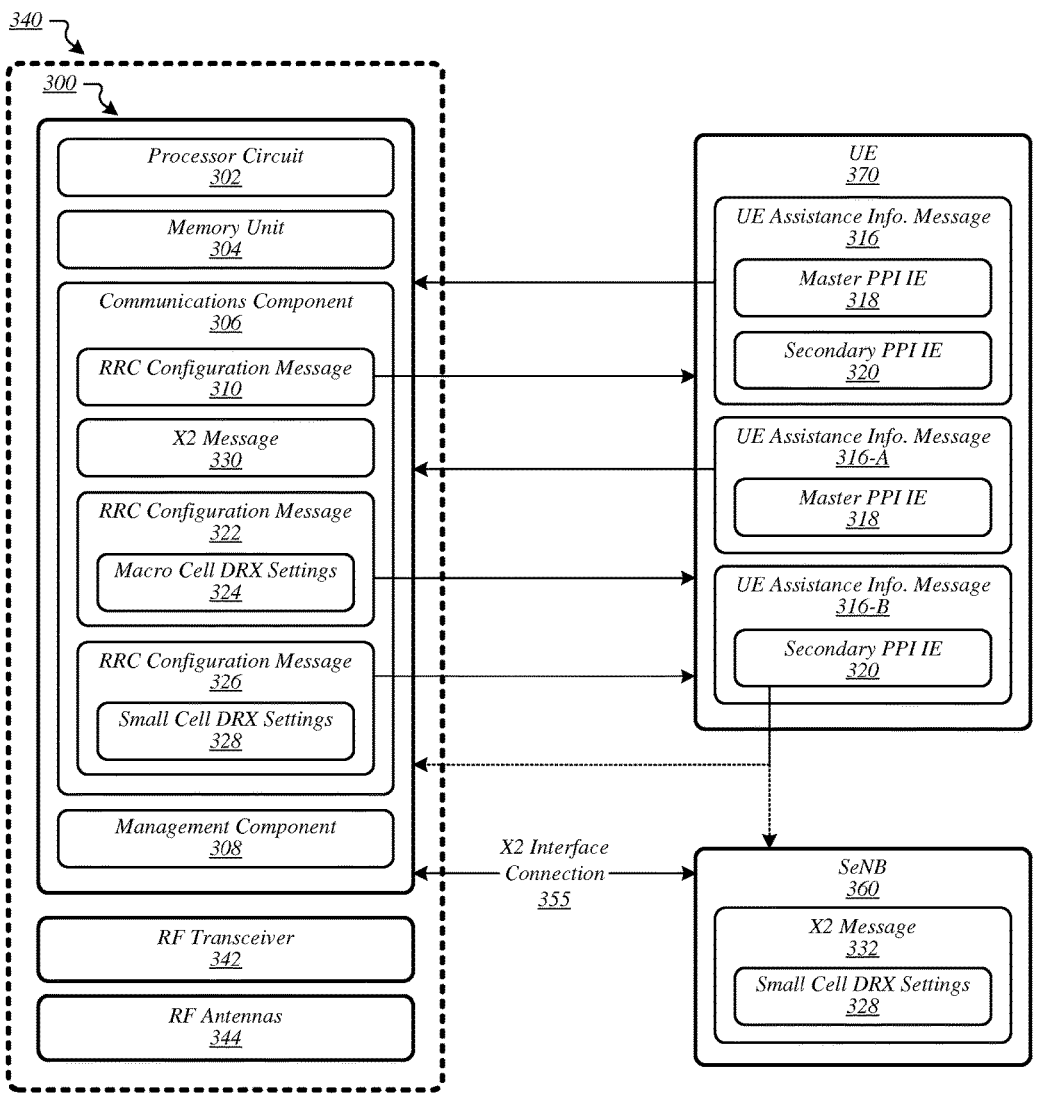
FIG. 3 illustrates an embodiment of a second apparatus and an embodiment of a second system.

FIG. 3 illustrates a block diagram of an apparatus 300 that may implement coordination techniques for DRX operations in dual-connectivity architectures in some embodiments. For example, apparatus 300 may be representative of MeNB 102 of FIG. 1 and/or MeNB 250 of FIG. 2. As shown in FIG. 3, apparatus 300 comprises multiple elements including a processor circuit 302, a memory unit 304, a communications component 306, and a management component 308. The embodiments, however, are not limited to the type, number, or arrangement of elements shown in this figure.

In various embodiments, apparatus 300 may comprise processor circuit 302. Processor circuit 302 may be implemented using any processor or logic device, examples of which may include—without limitation—any of the examples previously mentioned with respect to processor circuit 202 of FIG. 2. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. Examples of memory unit 304 may include—without limitation—any of the examples previously mentioned with respect to memory unit 204 of FIG. 2. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in various embodiments. The embodiments are not limited in this context.

In some embodiments, apparatus 300 may comprise a communications component 306. Communications component 306 may comprise logic, circuitry, and/or instructions operative to send messages to one or more remote devices and/or to receive messages from one or more remote devices. In various embodiments, communications component 306 may be operative to send and/or receive messages over one or more wired connections, one or more wireless connections, or a combination of both. In some embodiments, communications component 306 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 300 may comprise a management component 308. Management component 308 may comprise logic, circuitry, and/or instructions operative to track and/or manage the connectivity states and/or communication activities of one or more UEs or other mobile devices. In various embodiments, management component 308 may be configured to perform various determinations, decisions, selections, operations, and/or actions in conjunction with such tracking and/or management. In some embodiments, management component 308 may be configured to perform various determinations, decisions, selections, operations, and/or actions in support of coordination with an external control node such as an SeNB with regard to tracking and/or management of one or more dually-connected UEs. The embodiments are not limited in this context.

FIG. 3 also illustrates a block diagram of a system 340. System 340 may comprise any of the aforementioned elements of apparatus 300. System 340 may further comprise an RF transceiver 342. RF transceiver 342 may comprise one or more radios capable of transmitting and receiving signals using various suitable wireless communications techniques. Such techniques may involve communications across one or more wireless networks. Exemplary wireless networks may include, without limitation, any of the examples previously mentioned with respect to RF transceiver 242 of FIG. 2. In communicating across such networks, RF transceiver 342 may operate in accordance with one or more applicable standards in any version. The embodiments are not limited in this context.

In various embodiments, system 340 may comprise one or more RF antennas 344. Examples of any particular RF antenna 344 may include, without limitation, any of the examples previously mentioned with respect to RF antenna(s) 244 of FIG. 2. In some embodiments, RF transceiver 342 may be operative to send and/or receive messages and/or data using one or more RF antennas 344. The embodiments are not limited in this context.

In various embodiments, during general operation of apparatus 300 and/or system 340, a UE 370 may be operative to establish dual-connectivity with apparatus 300 and/or system 340 and an SeNB 360. In some embodiments, SeNB 360 may be the same as—or similar to—SeNB 104 of FIG. 1 and/or SeNB 260 of FIG. 2. In various embodiments, UE 370 may be the same as—or similar to—UE 120 of FIG. 1 and/or apparatus 200 and/or system 240 of FIG. 2. In some embodiments, UE 370 may be located within a small cell served by SeNB 360, and apparatus 300 and/or system 340 may serve a macro cell that is overlaid upon that small cell. The embodiments are not limited in this context.

In various embodiments, while UE 370 operates in a dually-connected state according to which it has concurrent data connectivity with apparatus 300 and/or system 340 and SeNB 360, communications component 306 may be operative to send an RRC configuration message 310 to UE 370 to enable UE assistance information reporting for UE 370. In some embodiments, RRC configuration message 310 may comprise an RRCConnectionReconfiguration message. In various embodiments, RRC configuration message 310 may comprise a powerPrefIndicationConfig field that contains value indicating that UE assistance information reporting is enabled for UE 370. In some embodiments, RRC configuration message 310 may comprise an RRCConnectionReconfiguration message containing an otherConfig 1E that in turn contains such a powerPrefIndicationConfig field. The embodiments are not limited in this context.

In various embodiments, communications component 306 may be operative to receive one or more UE assistance information messages from UE 370. In some embodiments, communications component 306 may be operative to receive the one or more UE assistance information messages in response to RRC configuration message 310. In various embodiments, in response to RRC configuration message 310, communications component 306 may be operative to receive a UE assistance information message 316 that indicates both a macro cell power preference and a small cell power preference of UE 370. In some such embodiments, the UE assistance information message 316 may comprise a master PPI IE 318 that indicates the macro cell power preference and a secondary PPI IE 320 that indicates the small cell power preference. In various other embodiments, communications component 306 may be operative to receive a UE assistance information message 316-A that indicates a macro cell power preference of UE 370, and may be operative to receive a UE assistance information message 316-B that indicates a small cell power preference of UE 370. In some such embodiments, the UE assistance information message 316-A may comprise a master PPI IE 318 that indicates the macro cell power preference, and the UE assistance information message 316-B may comprise a secondary PPI IE 320 that indicates the small cell power preference. The embodiments are not limited in this context.

In various embodiments, communications component 306 may be operative to report a small cell power preference for UE 370 to SeNB 360. In some embodiments, management component 308 may be operative to determine the small cell power preference for UE 370 based on a received UE assistance information message 316 or a received UE assistance information message 316-B. In various such embodiments, management component 308 may be operative to determine the small cell power preference for UE 370 based on a secondary PPI IE 320 comprised in the received UE assistance information message 316 or the received UE assistance information message 316-B. In some embodiments, communications component 306 may be operative to report the small cell power preference for UE 370 to SeNB 360 by sending a X2 message 330 to SeNB 360 over an X2 interface connection 355. In various embodiments, the X2 interface connection 355 may be implemented using a non-ideal backhaul. In some embodiments, the X2 message 330 may comprise an IE that contains a value to indicate the small cell power preference of UE 370. In various embodiments, UE 370 may be operative to send UE assistance information message 316-B directly to SeNB 360, rather than sending it to apparatus 300 and/or system 340. In such embodiments, communications component 306 may not be operative to report the small cell power preference for UE 370 to SeNB 360. The embodiments are not limited in this context.

In some embodiments, management component 308 may be operative to select macro cell DRX settings 324 for UE 370. In various embodiments, management component 308 may be operative to determine a macro cell power preference for UE 370 based on a master PPI IE 318 in a received UE assistance information message 316 or a received UE assistance information message 316-A, and may be operative to select macro cell DRX settings 324 based on that macro cell power preference. In some embodiments, macro cell DRX settings 324 may comprise DRX settings applicable to communications between UE 370 and apparatus 300 and/or system 340, and may be the same as—or similar to—macro cell DRX settings 224 of FIG. 2. The embodiments are not limited in this context.

In various embodiments, communications component 306 may be operative to receive a message from SeNB 360 that comprises small cell DRX settings 328 for UE 370. For example, in some embodiments, communications component 306 may be operative to receive an X2 message 332 from SeNB 360 over X2 interface connection 355, and the X2 message 332 may comprise the small cell DRX settings 328. In various embodiments, SeNB 360 may be operative to select the small cell DRX settings 328 for UE 370. In some embodiments, SeNB 360 may be operative to determine a small cell power preference for UE 370 based on a secondary PPI IE 320 in a received UE assistance information message 316-B, and may be operative to select small cell DRX settings 328 based on that small cell power preference. In various other embodiments, SeNB 360 may be operative to determine the small cell power preference for UE 370 based on a received X2 message 330 sent by communications component 306 to report the small cell power preference for UE 370 to SeNB 360. In some embodiments, small cell DRX settings 328 may comprise DRX settings applicable to communications between UE 370 and SeNB 360, and may be the same as—or similar to—small cell DRX settings 228 of FIG. 2. The embodiments are not limited in this context.

In various embodiments, communications component 306 may be operative to send macro cell DRX settings 324 and small cell DRX settings 328 to UE 370. In some embodiments, communications component 306 may be operative to send an RRC configuration message 322 to UE 370 that comprises macro cell DRX settings 324, and may be operative to send an RRC configuration message 326 to UE 370 that comprises small cell DRX settings 328. In various embodiments, apparatus 300 and/or system 340 may be operative to configure its communications with UE 370 based on macro cell DRX settings 328. In some embodiments, apparatus 300 and/or system 340 may be operative to configure transmissions over one or more control channels of the macro cell in accordance with macro cell DRX settings 328. The embodiments are not limited in this context.

Figure 4:
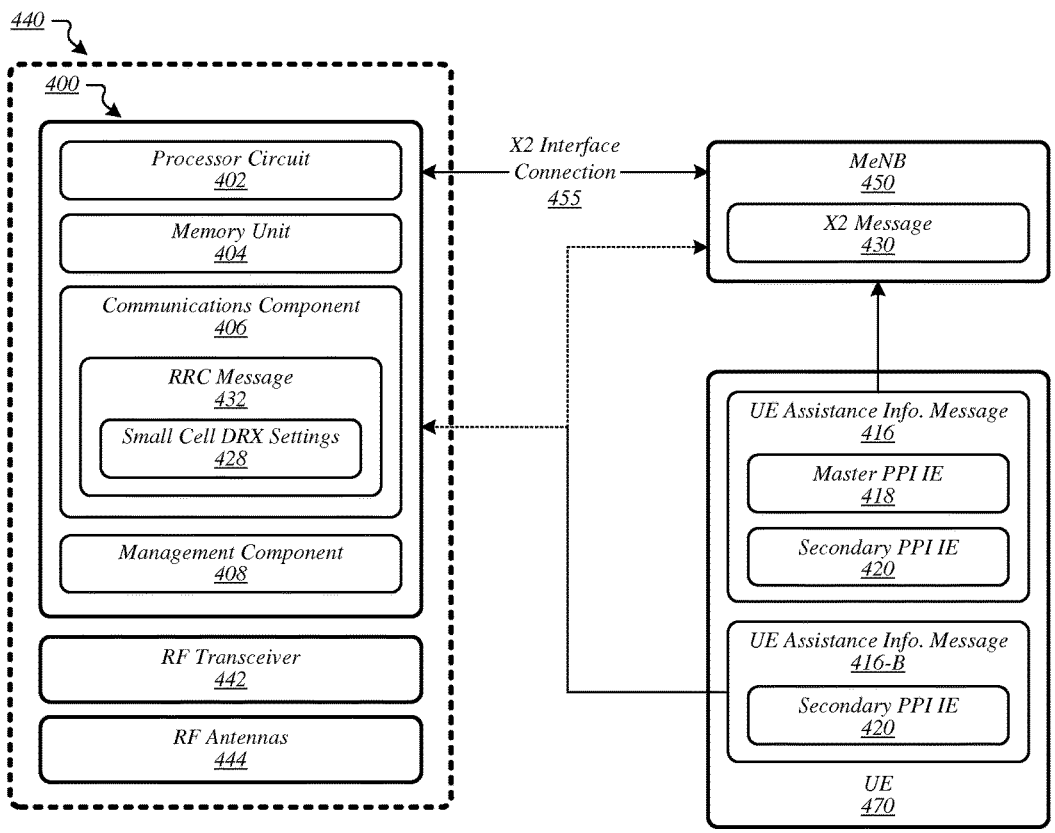
FIG. 4 illustrates an embodiment of a third apparatus and an embodiment of a third system.

FIG. 4 illustrates a block diagram of an apparatus 400 that may implement coordination techniques for DRX operations in dual-connectivity architectures in various embodiments. For example, apparatus 400 may be representative of SeNB 104 of FIG. 1, SeNB 260 of FIG. 2, and/or SeNB 360 of FIG. 3. As shown in FIG. 4, apparatus 400 comprises multiple elements including a processor circuit 402, a memory unit 404, a communications component 406, and a management component 408. The embodiments, however, are not limited to the type, number, or arrangement of elements shown in this figure.

In some embodiments, apparatus 400 may comprise processor circuit 402. Processor circuit 402 may be implemented using any processor or logic device, examples of which may include—without limitation—any of the examples previously mentioned with respect to processor circuit 202 of FIG. 2 and/or processor circuit 302 of FIG. 3. The embodiments are not limited in this context.

In various embodiments, apparatus 400 may comprise or be arranged to communicatively couple with a memory unit 404. Memory unit 404 may be implemented using any machine-readable or computer-readable media capable of storing data, including both volatile and non-volatile memory. Examples of memory unit 404 may include—without limitation—any of the examples previously mentioned with respect to memory unit 204 of FIG. 2 and/or memory unit 304 of FIG. 3. It is worthy of note that some portion or all of memory unit 404 may be included on the same integrated circuit as processor circuit 402, or alternatively some portion or all of memory unit 404 may be disposed on an integrated circuit or other medium, for example a hard disk drive, that is external to the integrated circuit of processor circuit 402. Although memory unit 404 is comprised within apparatus 400 in FIG. 4, memory unit 404 may be external to apparatus 400 in some embodiments. The embodiments are not limited in this context.

In various embodiments, apparatus 400 may comprise a communications component 406. Communications component 406 may comprise logic, circuitry, and/or instructions operative to send messages to one or more remote devices and/or to receive messages from one or more remote devices. In some embodiments, communications component 406 may be operative to send and/or receive messages over one or more wired connections, one or more wireless connections, or a combination of both. In various embodiments, communications component 406 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 400 may comprise a management component 408. Management component 408 may comprise logic, circuitry, and/or instructions operative to track and/or manage the connectivity states and/or communication activities of one or more UEs or other mobile devices. In various embodiments, management component 408 may be configured to perform various determinations, decisions, selections, operations, and/or actions in conjunction with such tracking and/or management. In some embodiments, management component 408 may be configured to perform various determinations, decisions, selections, operations, and/or actions in support of coordination with an external control node such as an MeNB with regard to tracking and/or management of one or more dually-connected UEs. The embodiments are not limited in this context.

FIG. 4 also illustrates a block diagram of a system 440. System 440 may comprise any of the aforementioned elements of apparatus 400. System 440 may further comprise an RF transceiver 442. RF transceiver 442 may comprise one or more radios capable of transmitting and receiving signals using various suitable wireless communications techniques. Such techniques may involve communications across one or more wireless networks. Exemplary wireless networks may include, without limitation, any of the examples previously mentioned with respect to RF transceiver 242 of FIG. 2 and/or RF transceiver 342 of FIG. 3. In communicating across such networks, RF transceiver 442 may operate in accordance with one or more applicable standards in any version. The embodiments are not limited in this context.

In various embodiments, system 440 may comprise one or more RF antennas 444. Examples of any particular RF antenna 444 may include, without limitation, any of the examples previously mentioned with respect to RF antenna(s) 244 of FIG. 2 and/or RF antenna(s) 344 of FIG. 3. In some embodiments, RF transceiver 442 may be operative to send and/or receive messages and/or data using one or more RF antennas 444. The embodiments are not limited in this context.

In some embodiments, during general operation of apparatus 400 and/or system 440, a UE 470 may be operative to establish dual-connectivity with apparatus 400 and/or system 440 and an MeNB 450. In various embodiments, MeNB 450 may be the same as—or similar to—MeNB 102 of FIG. 1, MeNB 250 of FIG. 2, and/or apparatus 300 and/or system 340 of FIG. 3. In some embodiments, UE 470 may be the same as—or similar to—UE 120 of FIG. 1, apparatus 200 and/or system 240 of FIG. 2, and/or UE 370 of FIG. 3. In various embodiments, UE 470 may be located within a small cell served by apparatus 400 and/or system 440, and MeNB 450 may serve a macro cell that is overlaid upon that small cell. The embodiments are not limited in this context.

In some embodiments, while UE 470 operates in a dually-connected state according to which it has concurrent data connectivity with apparatus 400 and/or system 440 and MeNB 450, communications component 406 may be operative to receive an indication of a small cell power preference of UE 470. In various embodiments, communications component 406 may be operative to receive the indication of the small cell power preference of UE 470 in conjunction with the performance of UE assistance information reporting by UE 470. In some embodiments, UE 470 may be operative to perform UE assistance information reporting in response to receipt of an RRC configuration message from MeNB 450, such as RRC configuration message 210 of FIG. 2 or RRC configuration message 310 of FIG. 3. The embodiments are not limited in this context.

In various embodiments, communications component 406 may be operative to receive the indication of the small cell power preference of UE 470 from MeNB 450. In some embodiments, for example, communications component 406 may be operative to receive an X2 message 430 from MeNB 450 over an X2 interface connection 455, and the X2 message 430 may comprise an indication of the small cell power preference of UE 470. In various embodiments, the X2 interface connection 455 may be implemented using a non-ideal backhaul. In some embodiments, MeNB 450 may be operative to receive a message from UE 470 that indicates the small cell power preference of UE 470, and may be operative to report the small cell power preference of UE 470 to apparatus 400 and/or system 440 by sending X2 message 430. In various embodiments, MeNB 450 may be operative to receive a UE assistance information message from UE 470 that comprises a secondary PPI IE 420 that indicates the small cell power preference of UE 470. In some embodiments, MeNB 450 may be operative to send X2 message 430 to report a small cell power preference indicated by a secondary PPI IE 420 comprised in a UE assistance information message 416 that also comprises a master PPI IE 418 indicating a macro cell power preference of UE 470. In various other embodiments, MeNB 450 may be operative to send X2 message 430 to report a small cell power preference indicated by a secondary PPI IE 420 comprised in a UE assistance information message 416-B that does not comprise a master PPI IE 418. In yet other embodiments, rather than receiving the indication of the small cell power preference of UE 470 from MeNB 450, communications component 406 may be operative to receive that indication directly from UE 470. For example, in some embodiments, UE 470 may be operative to send UE assistance information message 416-B directly to apparatus 400 and/or system 440. The embodiments are not limited in this context.

In various embodiments, management component 408 may be operative to determine the small cell power preference of UE 470 based on the received indication, and may be operative to select small cell DRX settings 428 for UE 470 based on that small cell power preference. In some embodiments, small cell DRX settings 428 may comprise DRX settings applicable to communications between UE 470 and apparatus 400 and/or system 440, and may be the same as—or similar to—small cell DRX settings 228 of FIG. 2 and/or small cell DRX settings 328 of FIG. 3. The embodiments are not limited in this context.

In various embodiments, communications component 406 may be operative to send an RRC message 432 in order to report the selected small cell DRX settings 428. In some embodiments, communications component 406 may be operative to send the RRC message 432 to MeNB 450. In various embodiments, the RRC message 432 may comprise an X2 message that communications component 406 sends to MeNB 450 over X2 interface connection 455. In some embodiments, MeNB 450 may then be operative to send an RRC configuration message to UE 470 in order to report the selected small cell DRX settings 428 to UE 470. In various embodiments, apparatus 400 and/or system 440 may be operative to configure its communications with UE 470 based on small cell DRX settings 428. In some embodiments, apparatus 400 and/or system 440 may be operative to configure transmissions over one or more control channels of the small cell in accordance with small cell DRX settings 428. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
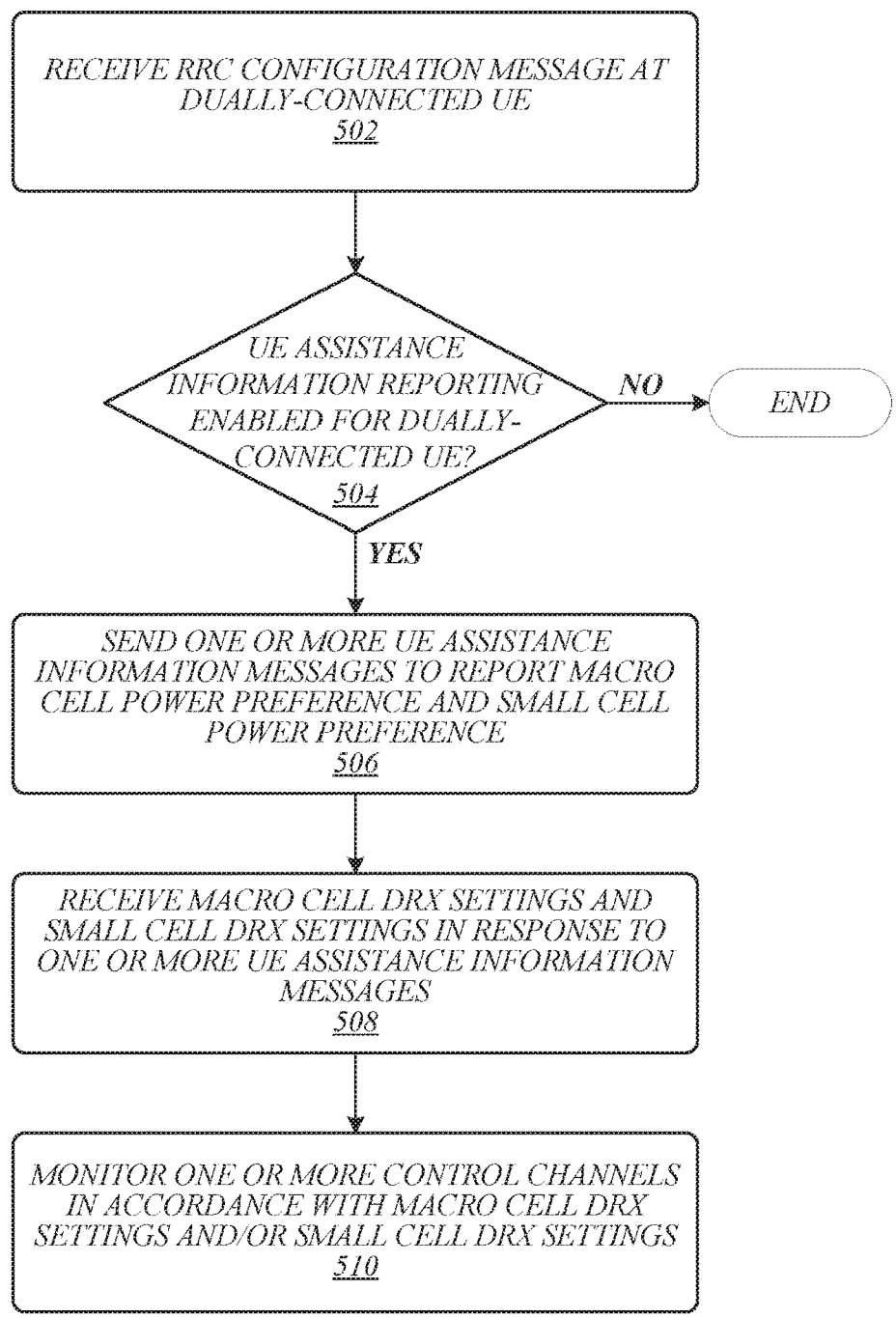
FIG. 5 illustrates an embodiment of a first logic flow.

FIG. 5 illustrates one embodiment of a logic flow 500, which may be representative of the operations executed by one or more embodiments described herein. For example, logic flow 500 may be representative of operations that may be performed in various embodiments by apparatus 200 and/or system 240 of FIG. 2. As shown in logic flow 500, at 502, an RRC configuration message may be received at a dually-connected UE. For example, communications component 206 of FIG. 2 may be operative to receive RRC configuration message 210 from MeNB 250. At 504, based on the received RRC configuration message, it may be determined whether UE assistance information reporting is enabled for the dually-connected UE. For example, management component 208 of FIG. 2 may be operative to determine whether UE assistance information reporting is enabled for apparatus 200 and/or system 240 based on RRC configuration message 210. If it is determined that UE assistance information reporting is not enabled for the dually-connected UE, the logic flow may end. If it is determined that UE assistance information reporting is enabled for the dually-connected UE, flow may pass to 506.

At 506, one or more UE assistance information messages may be sent to report a macro cell power preference and a small cell power preference. For example, communications component 206 of FIG. 2 may be operative to send a UE assistance information message 216 to report a macro cell power preference and a small cell power preference. In another example, communications component 206 of FIG. 2 may be operative to send a UE assistance information message 216-A to report a macro cell power preference, and may be operative to send a UE assistance information message 216-B to report a small cell power preference. At 508, macro cell DRX settings and small cell DRX settings may be received in response to the one or more UE assistance information messages. For example, communications component 206 of FIG. 2 may be operative to receive macro cell DRX settings 224 and small cell DRX settings 228 in response to UE assistance information message 216. In another example, communications component 206 of FIG. 2 may be operative to receive macro cell DRX settings 224 and small cell DRX settings 228 in response to UE assistance information message 216-A and UE assistance information message 216-B. At 510, one or more control channels may be monitored in accordance with the macro cell DRX settings and/or the small cell DRX settings. For example, apparatus 200 and/or system 240 of FIG. 2 may be operative to monitor one or more macro cell control channels in accordance with macro cell DRX settings 224, and may be operative to monitor one or more small cell control channels in accordance with small cell DRX settings 228. The embodiments are not limited to these examples.

Figure 6:
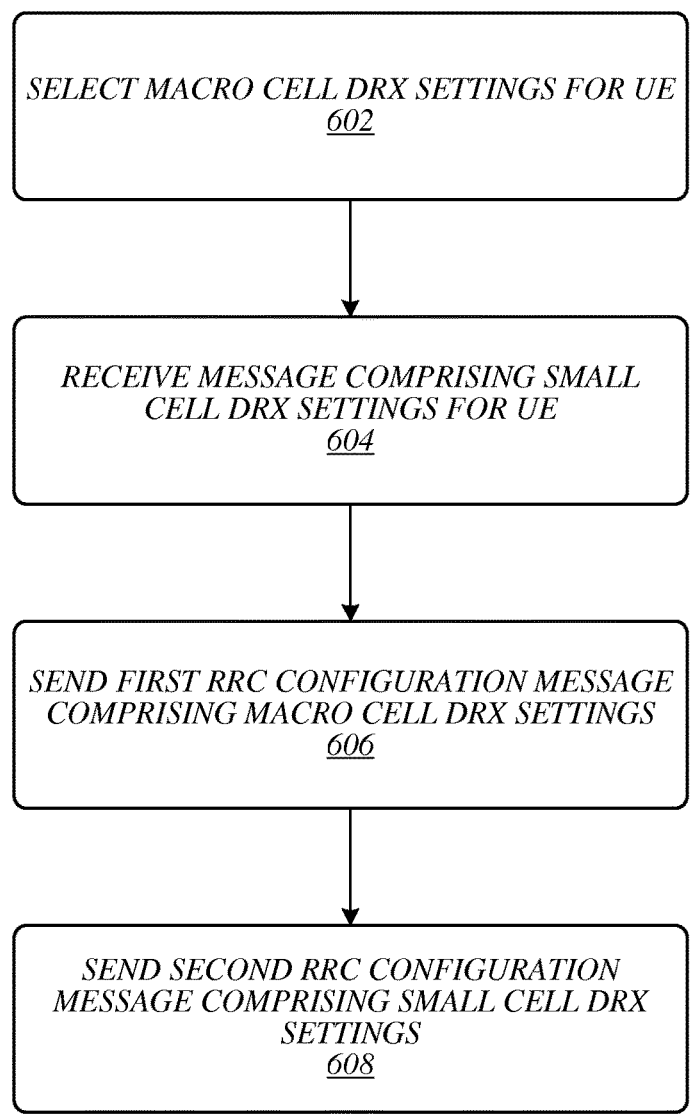
FIG. 6 illustrates an embodiment of a second logic flow.

FIG. 6 illustrates one embodiment of a logic flow 600, which may be representative of the operations executed by one or more embodiments described herein. For example, logic flow 600 may be representative of operations that may be performed in some embodiments by apparatus 300 and/or system 340 of FIG. 3. As shown in logic flow 600, macro cell DRX settings for a UE may be selected at 602. For example, management component 308 of FIG. 3 may be operative to select macro cell DRX settings 324 for UE 370. At 604, a message may be received that comprises small cell DRX settings for the UE. For example, communications component 306 of FIG. 3 may be operative to receive an X2 message 332 from SeNB 360 that comprises small cell DRX settings 328 for UE 370. At 606, a first RRC configuration message may be sent that comprises the macro cell DRX settings. For example, communications component 306 of FIG. 3 may be operative to send an RRC configuration message 322 to UE 370 that comprises the macro cell DRX settings 324 for UE 370. At 608, a second RRC configuration message may be sent that comprises the small cell DRX settings. For example, communications component 306 of FIG. 3 may be operative to send an RRC configuration message 326 to UE 370 that comprises the small cell DRX settings 328 for UE 370. The embodiments are not limited to these examples.

FIG. 7 illustrates one embodiment of a logic flow 700, which may be representative of the operations executed by one or more embodiments described herein. For example, logic flow 700 may be representative of operations that may be performed in various embodiments by apparatus 400 and/or system 440 of FIG. 4. As shown in logic flow 700, an indication of a small cell power preference of a UE may be received at 702. For example, communications component 406 of FIG. 4 may be operative to receive an X2 message 430 from MeNB 450 that comprises an indication of a small cell power preference of UE 470. In another example, communications component 406 of FIG. 4 may be operative to receive a UE assistance information message 416-B from UE 470 that comprises an indication of a small cell power preference of UE 470. At 704, small cell DRX settings may be selected for the UE based on the small cell power preference. For example, management component 408 of FIG. 4 may be operative to select small cell DRX settings 428 for UE 470 based on the small cell power preference of UE 470. At 706, an RRC message may be sent to report the selected small cell DRX settings. For example, communications component 406 of FIG. 4 may be operative to send an RRC message 432 to MeNB 450 in order to report selected small cell DRX settings 428. The embodiments are not limited to these examples.

FIG. 8 illustrates an ASN format for an example UE assistance information message 800 such as may be used by a UE in some embodiments to report its macro cell power preference and its small cell power preference. For example, example UE assistance information message 800 may be representative of UE assistance information message 216 of FIG. 2 in various embodiments. As shown in FIG. 8, UE assistance information message 800 comprises a powerPrefIndication-r11 field 802 and a powerPrefIndicationSeNB-r12 field 804, each of which may contain either a value of normal or a value of lowPowerConsumption. A UE that sends UE assistance information message 800 may select the value of powerPrefIndication-r11 field 802 to indicate its macro cell power preference, and may select the value of powerPrefIndicationSeNB-r12 field 804 to indicate its small cell power preference. With respect to macro cell communications, if the UE prefers a configuration that is primarily optimized for power savings, it may set powerPrefIndication-r11 field 802 to the lowPowerConsumption value. Otherwise, it may set powerPrefIndication-r11 field 802 to normal. With respect to small cell communications, if the UE prefers a configuration that is primarily optimized for power savings, it may set powerPrefIndicationSeNB-r12 field 804 to the lowPowerConsumption value. Otherwise, it may set powerPrefIndicationSeNB-r12 field 804 to normal. The embodiments are not limited to this example.

Figure 9A:
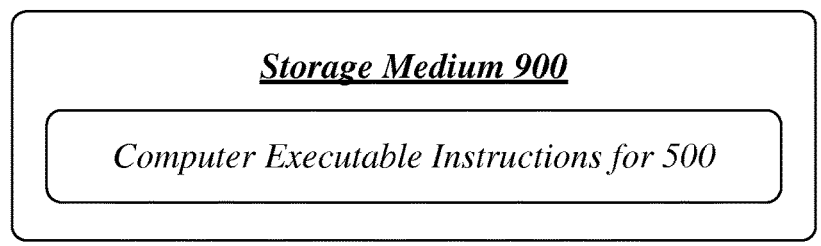
FIG. 9A illustrates an embodiment of a first storage medium.

FIG. 9A illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9B:
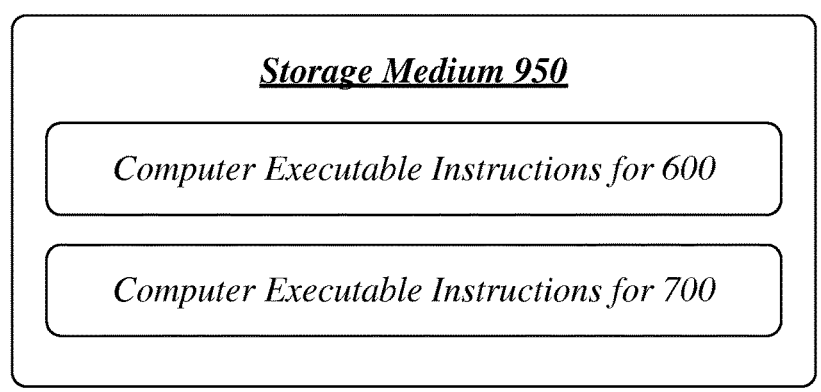
FIG. 9B illustrates an embodiment of a second storage medium.

FIG. 9B illustrates an embodiment of a storage medium 950. Storage medium 950 may comprise any non-transitory computer-readable storage medium or machine-readable storage medium, such as an optical, magnetic or semiconductor storage medium. In various embodiments, storage medium 950 may comprise an article of manufacture. In some embodiments, storage medium 950 may store computer-executable instructions, such as computer-executable instructions to implement one or both of logic flow 600 of FIG. 6 and logic flow 700 of FIG. 7. Examples of a computer-readable storage medium and of computer-executable instructions may include any of the examples previously mentioned with respect to storage medium 900 of FIG. 9A. The embodiments are not limited in this context.

Figure 10:
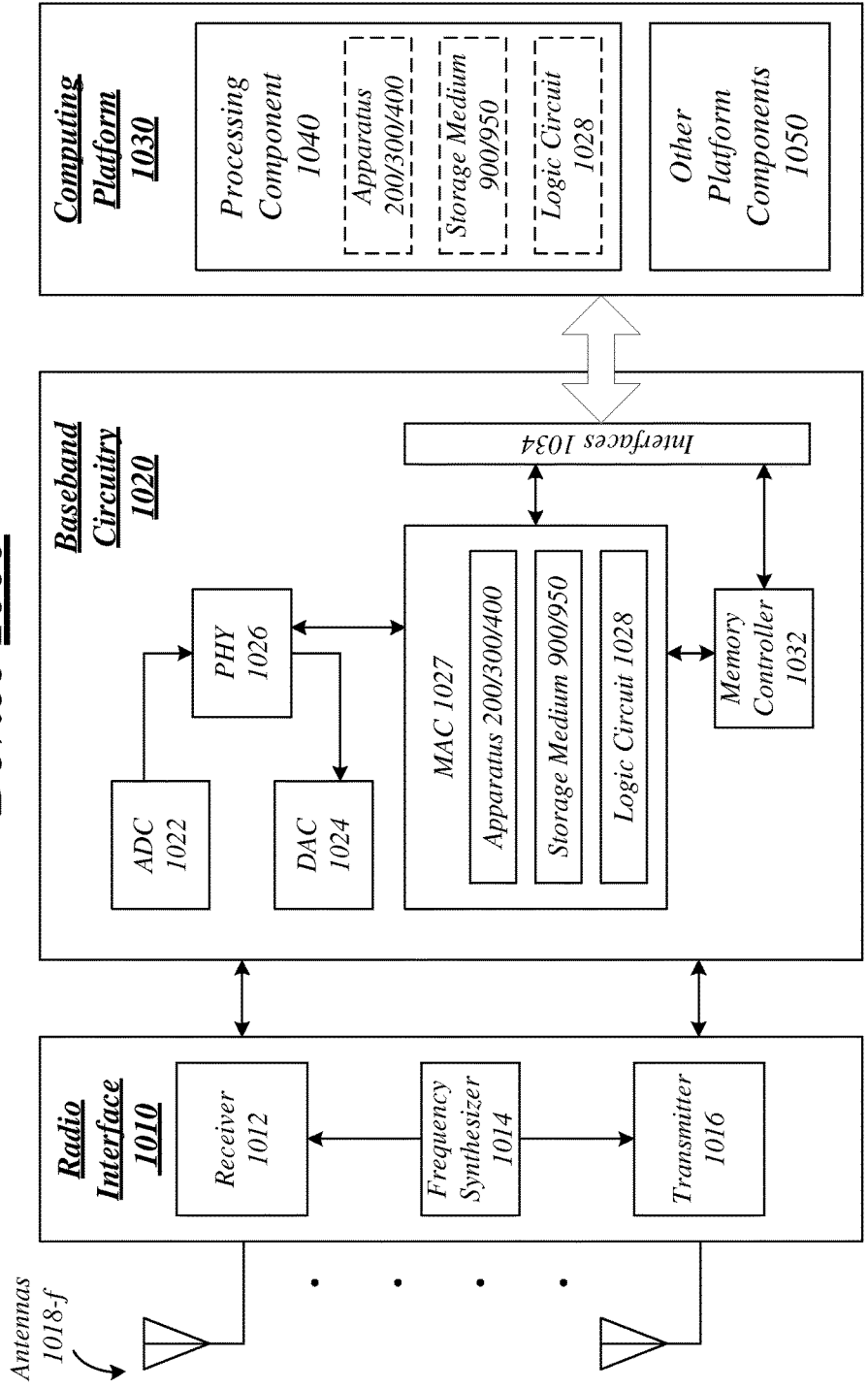
FIG. 10 illustrates an embodiment a device.

FIG. 10 illustrates an embodiment of a communications device 1000 that may implement one or more of apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, logic flow 700 of FIG. 7, storage medium 900 of FIG. 9A, and storage medium 950 of FIG. 9B. In various embodiments, device 1000 may comprise a logic circuit 1028. The logic circuit 1028 may include physical circuits to perform operations described for one or more of apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, and logic flow 700 of FIG. 7, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, logic flow 700 of FIG. 7, storage medium 900 of FIG. 9A, storage medium 950 of FIG. 9B, and logic circuit 1028 in a single computing entity, such as entirely within a single device. Alternatively, the device 1000 may distribute portions of the structure and/or operations for one or more of apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, logic flow 700 of FIG. 7, storage medium 900 of FIG. 9A, storage medium 950 of FIG. 9B, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-toanalog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, logic flow 700 of FIG. 7, storage medium 900 of FIG. 9A, storage medium 950 of FIG. 9B, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas **1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 11 illustrates an embodiment of a broadband wireless access system 1100. As shown in FIG. 11, broadband wireless access system 1100 may be an internet protocol (IP)

type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is user equipment (UE), comprising logic, at least a portion of which is in hardware, the logic to receive a radio resource control (RRC) configuration message during operation in a dually-connected UE state, determine whether UE assistance information reporting is enabled for the UE based on the RRC configuration message, and in response to a determination that UE assistance information reporting is enabled for the UE, send one or more UE assistance information messages to report a macro cell power preference and a small cell power preference.

In Example 2, the one or more UE assistance information messages of Example 1 may optionally collectively comprise a master power preference indication (PPI) information element (IE) to indicate the macro cell power preference and a secondary PPI IE to indicate the small cell power preference.

In Example 3, the logic of Example 2 may optionally send one UE assistance information message to report the macro cell power preference and the small cell power preference, the one UE assistance information message to comprise the master PPI IE and the secondary PPI IE. In Example 4, the logic of Example 3 may optionally send the one UE assistance information message to a master evolved node B (MeNB) of a serving macro cell of the UE.

In Example 5, the logic of Example 2 may optionally send a first UE assistance information message to report the macro cell power preference and send a second UE assistance information message to report the small cell power preference, the first UE assistance information message to comprise the master PPI IE, the second UE assistance information message to comprise the secondary PPI IE.

In Example 6, the logic of Example 5 may optionally send the first UE assistance information message to a master evolved node B (MeNB) of a serving macro cell of the UE.

In Example 7, the logic of Example 6 may optionally send the second UE assistance information message to the MeNB.

In Example 8, the logic of any of Examples 6 to 7 may optionally send the second UE assistance information message to a secondary evolved node B (SeNB) of a serving small cell of the UE.

In Example 9, the logic of any of Examples 1 to 8 may optionally receive macro cell discontinuous reception (DRX) settings and small cell DRX settings in response to the one or more UE assistance information messages.

In Example 10, the logic of Example 9 may optionally send at least one of the one or more UE assistance information messages to a master evolved node B (MeNB) of a serving macro cell of the UE and receive the macro cell DRX settings and the small cell DRX settings from the MeNB.

In Example 11, the logic of any of Examples 9 to 10 may optionally monitor one or more control channels of a macro cell in accordance with the macro cell DRX settings.

In Example 12, the logic of any of Examples 9 to 11 may optionally monitor one or more control channels of a small cell in accordance with the small cell DRX settings.

In Example 13, the UE of any of Examples 1 to 12 may optionally comprise at least one radio frequency (RF) transceiver, and at least one RF antenna.

In Example 14, the UE of Example 13 may optionally comprise a touchscreen display.

Example 15 is at least one non-transitory computer-readable storage medium comprising a set of wireless communication instructions that, in response to being executed at a master evolved node B (MeNB), cause the MeNB to select macro cell discontinuous reception (DRX) settings for a user equipment (UE), receive a message comprising small cell DRX settings for the UE, send a first radio resource control (RRC) configuration message comprising the macro cell DRX settings, and send a second RRC configuration message comprising the small cell DRX settings.

In Example 16, the at least one non-transitory computer-readable storage medium of Example 15 may optionally comprise wireless communication instructions that, in response to being executed at the MeNB, cause the MeNB to receive a UE assistance information message indicating a macro cell power preference of the UE, and select the macro cell DRX settings for the UE based on the macro cell power preference.

In Example 17, the UE assistance information message of Example 16 may optionally comprise a master power preference indication (PPI) information element (IE) that indicates the macro cell power preference.

In Example 18, the at least one non-transitory computer-readable storage medium of any of Examples 16 to 17 may optionally comprise wireless communication instructions that, in response to being executed at the MeNB, cause the MeNB to send an RRC message to enable UE assistance information reporting for the UE, and receive the UE assistance information message in response to the RRC message.

In Example 19, the at least one non-transitory computer-readable storage medium of Example 18 may optionally comprise wireless communication instructions that, in response to being executed at the MeNB, cause the MeNB to receive an indication of a small cell power preference of the UE in response to the RRC message.

In Example 20, the UE assistance information message of Example 19 may optionally comprise the indication of the small cell power preference.

In Example 21, the UE assistance information message of Example 20 may optionally comprise a secondary power preference indication (PPI) information element (IE) that indicates the small cell power preference.

In Example 22, the at least one non-transitory computer-readable storage medium of Example 19 may optionally comprise wireless communication instructions that, in response to being executed at the MeNB, cause the MeNB to receive a second UE assistance information message that comprises the indication of the small cell power preference in response to the RRC message.

In Example 23, the at least one non-transitory computer-readable storage medium of any of Examples 19 to 22 may optionally comprise wireless communication instructions that, in response to being executed at the MeNB, cause the MeNB to report the small cell power preference to a secondary evolved node B (SeNB) of a serving small cell of the UE.

In Example 24, the at least one non-transitory computer-readable storage medium of Example 23 may optionally comprise wireless communication instructions that, in response to being executed at the MeNB, cause the MeNB to report the small cell power preference to the SeNB by sending a message over an X2 interface connection.

In Example 25, the X2 interface connection of Example 24 may optionally be implemented using a non-ideal backhaul.

In Example 26, the at least one non-transitory computer-readable storage medium of any of Examples 23 to 25 may optionally comprise wireless communication instructions that, in response to being executed at the MeNB, cause the MeNB to receive the message comprising the small cell DRX settings in response to reporting the small cell power preference to the SeNB.

In Example 27, the at least one non-transitory computer-readable storage medium of any of Examples 15 to 26 may optionally comprise wireless communication instructions that, in response to being executed at the MeNB, cause the MeNB to configure one or more transmissions over one or more macro cell control channels in accordance with the macro cell DRX settings.

Example 28 is a wireless communication method, comprising receiving, at a secondary evolved node B (SeNB) comprising a processor circuit, an indication of a small cell power preference of a user equipment (UE), selecting, by the processor circuit, small cell discontinuous reception (DRX) settings for the UE based on the small cell power preference, and sending a radio resource control (RRC) message to report the selected small cell DRX settings.

In Example 29, the wireless communication method of Example 28 may optionally comprise receiving a message comprising the indication of the small cell power preference over an X2 interface connection.

In Example 30, the X2 interface connection of Example 29 may optionally be implemented using a non-ideal backhaul.

In Example 31, the wireless communication method of any of Examples 29 to 30 may optionally comprise sending the RRC message over the X2 interface connection.

In Example 32, the wireless communication method of any of Examples 29 to 31 may optionally comprise receiving the message comprising the indication of the small cell power preference from a master evolved node B (MeNB) of a serving macro cell of the UE.

In Example 33, the received message of any of Examples 29 to 32 may optionally comprise a power preference indication (PPI) information element (IE) that indicates the small cell power preference.

In Example 34, the wireless communication method of Example 28 may optionally comprise receiving a UE assistance information message comprising the indication of the small cell power preference.

In Example 35, the UE assistance information message of Example 34 may optionally comprise a power preference indication (PPI) information element (IE) that indicates the small cell power preference.

In Example 36, the wireless communication method of Example 35 may optionally comprise receiving the UE assistance information message from the UE.

In Example 37, the wireless communication method of any of Examples 28 to 36 may optionally comprise sending the RRC message to a master evolved node B (MeNB) of a serving macro cell of the UE.

In Example 38, the wireless communication method of any of Examples 28 to 37 may optionally comprise configuring at least one transmission over at least one small cell control channel based on the small cell DRX settings.

Example 39 is at least one non-transitory computer-readable storage medium comprising a set of instructions that, in response to being executed on a computing device, cause the computing device to perform a wireless communication method according to any of Examples 28 to 38.

Example 40 is an apparatus, comprising means for performing a wireless communication method according to any of Examples 28 to 38.

Example 41 is a system, comprising an apparatus according to Example 40, at least one radio frequency (RF) transceiver, and at least on RF antenna.

In Example 42, the system of Example 41 may optionally comprise at least one memory unit.

Example 43 is a wireless communication apparatus, comprising means for selecting, at a master evolved node B (MeNB), macro cell discontinuous reception (DRX) settings for a user equipment (UE), means for receiving a message comprising small cell DRX settings for the UE, means for sending a first radio resource control (RRC) configuration message comprising the macro cell DRX settings, and means for sending a second RRC configuration message comprising the small cell DRX settings.

In Example 44, the wireless communication apparatus of Example 43 may optionally comprise means for receiving a UE assistance information message indicating a macro cell power preference of the UE, and means for selecting the macro cell DRX settings for the UE based on the macro cell power preference.

In Example 45, the UE assistance information message of Example 44 may optionally comprise a master power preference indication (PPI) information element (IE) that indicates the macro cell power preference.

In Example 46, the wireless communication apparatus of any of Examples 44 to 45 may optionally comprise means for sending an RRC message to enable UE assistance information reporting for the UE, and means for receiving the UE assistance information message in response to the RRC message.

In Example 47, the wireless communication apparatus of Example 46 may optionally comprise means for receiving an indication of a small cell power preference of the UE in response to the RRC message.

In Example 48, the UE assistance information message of Example 47 may optionally comprise the indication of the small cell power preference.

In Example 49, the UE assistance information message of Example 48 may optionally comprise a secondary power preference indication (PPI) information element (IE) that indicates the small cell power preference.

In Example 50, the wireless communication apparatus of Example 47 may optionally comprise means for receiving a second UE assistance information message that comprises the indication of the small cell power preference in response to the RRC message.

In Example 51, the wireless communication apparatus of any of Examples 47 to 50 may optionally comprise means for reporting the small cell power preference to a secondary evolved node B (SeNB) of a serving small cell of the UE.

In Example 52, the wireless communication apparatus of Example 51 may optionally comprise means for reporting the small cell power preference to the SeNB by sending a message over an X2 interface connection.

In Example 53, the X2 interface connection of Example 52 may optionally be implemented using a non-ideal backhaul.

In Example 54, the wireless communication apparatus of any of Examples 51 to 53 may optionally comprise means for receiving the message comprising the small cell DRX settings in response to reporting the small cell power preference to the SeNB.

In Example 55, the wireless communication apparatus of any of Examples 43 to 54 may optionally comprise means for configuring one or more transmissions over one or more macro cell control channels in accordance with the macro cell DRX settings.

Example 56 is a system, comprising a wireless communication apparatus according to any of Examples 43 to 55 at least one radio frequency (RF) transceiver, and at least one RF antenna.

In Example 57, the system of Example 56 may optionally comprise at least one memory unit.

Example 58 is a secondary evolved node B (SeNB), comprising logic, at least a portion of which is in hardware, the logic to receive an indication of a small cell power preference of a user equipment (UE), select small cell discontinuous reception (DRX) settings for the UE based on the small cell power preference, and send a radio resource control (RRC) message to report the selected small cell DRX settings.

In Example 59, the logic of Example 58 may optionally receive a message comprising the indication of the small cell power preference over an X2 interface connection.

In Example 60, the X2 interface connection of Example 59 may optionally be implemented using a non-ideal backhaul.

In Example 61, the logic of any of Examples 59 to 60 may optionally send the RRC message over the X2 interface connection.

In Example 62, the logic of any of Examples 59 to 61 may optionally receive the message comprising the indication of the small cell power preference from a master evolved node B (MeNB) of a serving macro cell of the UE.

In Example 63, the received message of any of Examples 59 to 62 may optionally comprise a power preference indication (PPI) information element (IE) that indicates the small cell power preference.

In Example 64, the logic of Example 58 may optionally receive a UE assistance information message comprising the indication of the small cell power preference.

In Example 65, the UE assistance information message of Example 64 may optionally comprise a power preference indication (PPI) information element (IE) that indicates the small cell power preference.

In Example 66, the logic of Example 65 may optionally receive the UE assistance information message from the UE.

In Example 67, the logic of any of Examples 58 to 66 may optionally send the RRC message to a master evolved node B (MeNB) of a serving macro cell of the UE.

In Example 68, the logic of any of Examples 58 to 67 may optionally configure at least one transmission over at least one small cell control channel based on the small cell DRX settings.

In Example 69, the SeNB of any of Examples 58 to 68 may optionally comprise at least one radio frequency (RF) transceiver, and at least one RF antenna.

In Example 70, the SeNB of Example 69 may optionally comprise at least one memory unit.

Example 71 is at least one non-transitory computer-readable storage medium comprising a set of wireless communication instructions that, in response to being executed on a user equipment (UE), cause the UE to receive a radio resource control (RRC) configuration message during operation in a dually-connected UE state, determine whether UE assistance information reporting is enabled for the UE based on the RRC configuration message, and in response to a determination that UE assistance information reporting is enabled for the UE, send one or more UE assistance information messages to report a macro cell power preference and a small cell power preference.

In Example 72, the one or more UE assistance information messages of Example 71 may optionally collectively comprise a master power preference indication (PPI) information element (IE) to indicate the macro cell power preference and a secondary PPI IE to indicate the small cell power preference.

In Example 73, the at least one non-transitory computer-readable storage medium of Example 72 may optionally comprise wireless communication instructions that, in response to being executed on the UE, cause the UE to send one UE assistance information message to report the macro cell power preference and the small cell power preference, the one UE assistance information message to comprise the master PPI IE and the secondary PPI IE.

In Example 74, the at least one non-transitory computer-readable storage medium of Example 73 may optionally comprise wireless communication instructions that, in response to being executed on the UE, cause the UE to send the one UE assistance information message to a master evolved node B (MeNB) of a serving macro cell of the UE.

In Example 75, the at least one non-transitory computer-readable storage medium of Example 72 may optionally comprise wireless communication instructions that, in response to being executed on the UE, cause the UE to send a first UE assistance information message to report the macro cell power preference, the first UE assistance information message to comprise the master PPI IE, and send a second UE assistance information message to report the small cell power preference, the second UE assistance information message to comprise the secondary PPI IE.

In Example 76, the at least one non-transitory computer-readable storage medium of Example 75 may optionally comprise wireless communication instructions that, in response to being executed on the UE, cause the UE to send the first UE assistance information message to a master evolved node B (MeNB) of a serving macro cell of the UE.

In Example 77, the at least one non-transitory computer-readable storage medium of Example 76 may optionally comprise wireless communication instructions that, in response to being executed on the UE, cause the UE to send the second UE assistance information message to the MeNB.

In Example 78, the at least one non-transitory computer-readable storage medium of Example 76 may optionally comprise wireless communication instructions that, in response to being executed on the UE, cause the UE to send the second UE assistance information message to a secondary evolved node B (SeNB) of a serving small cell of the UE.

In Example 79, the at least one non-transitory computer-readable storage medium of any of Examples 71 to 78 may optionally comprise wireless communication instructions that, in response to being executed on the UE, cause the UE to receive macro cell discontinuous reception (DRX) settings and small cell DRX settings in response to the one or more UE assistance information messages.

In Example 80, the at least one non-transitory computer-readable storage medium of Example 79 may optionally comprise wireless communication instructions that, in response to being executed on the UE, cause the UE to send at least one of the one or more UE assistance information messages to a master evolved node B (MeNB) of a serving macro cell of the UE, and receive the macro cell DRX settings and the small cell DRX settings from the MeNB.

In Example 81, the at least one non-transitory computer-readable storage medium of any of Examples 79 to 80 may optionally comprise wireless communication instructions that, in response to being executed on the UE, cause the UE to monitor one or more control channels of a macro cell in accordance with the macro cell DRX settings.

In Example 82, the at least one non-transitory computer-readable storage medium of any of Examples 79 to 81 may optionally comprise wireless communication instructions that, in response to being executed on the UE, cause the UE to monitor one or more control channels of a small cell in accordance with the small cell DRX settings.

Example 83 is a wireless communication apparatus, comprising means for receiving, at a secondary evolved node B (SeNB), an indication of a small cell power preference of a user equipment (UE), means for selecting small cell discontinuous reception (DRX) settings for the UE based on the small cell power preference, and means for sending a radio resource control (RRC) message to report the selected small cell DRX settings.

In Example 84, the wireless communication apparatus of Example 83 may optionally comprise means for receiving a message comprising the indication of the small cell power preference over an X2 interface connection.

In Example 85, the X2 interface connection of Example 84 may optionally be implemented using a non-ideal backhaul.

In Example 86, the wireless communication apparatus of any of Examples 84 to 85 may optionally comprise means for sending the RRC message over the X2 interface connection.

In Example 87, the wireless communication apparatus of any of Examples 84 to 86 may optionally comprise means for receiving the message comprising the indication of the small cell power preference from a master evolved node B (MeNB) of a serving macro cell of the UE.

In Example 88, the received message of any of Examples 84 to 87 may optionally comprise a power preference indication (PPI) information element (IE) that indicates the small cell power preference.

In Example 89, the wireless communication apparatus of Example 83 may optionally comprise means for receiving a UE assistance information message comprising the indication of the small cell power preference.

In Example 90, the UE assistance information message of Example 89 may optionally comprise a power preference indication (PPI) information element (IE) that indicates the small cell power preference.

In Example 91, the wireless communication apparatus of Example 90 may optionally comprise means for receiving the UE assistance information message from the UE.

In Example 92, the wireless communication apparatus of any of Examples 83 to 91 may optionally comprise means for sending the RRC message to a master evolved node B (MeNB) of a serving macro cell of the UE.

In Example 93, the wireless communication apparatus of any of Examples 83 to 92 may optionally comprise means for configuring at least one transmission over at least one small cell control channel based on the small cell DRX settings.

Example 94 is a system, comprising a wireless communication apparatus according to any of Examples 83 to 93 at least one radio frequency (RF) transceiver, and at least one RF antenna.

In Example 95, the system of Example 94 may optionally comprise at least one memory unit.

Example 96 is a wireless communication method, comprising receiving, at user equipment (UE) comprising a processor circuit, a radio resource control (RRC) configuration message during operation in a dually-connected UE state, determining, by the processor circuit, whether UE assistance information reporting is enabled for the UE based on the RRC configuration message, and in response to a determination that UE assistance information reporting is enabled for the UE, sending one or more UE assistance information messages to report a macro cell power preference and a small cell power preference.

In Example 97, the one or more UE assistance information messages of Example 96 may optionally collectively comprise a master power preference indication (PPI) information element (IE) to indicate the macro cell power preference and a secondary PPI IE to indicate the small cell power preference.

In Example 98, the wireless communication method of Example 97 may optionally comprise sending one UE assistance information message to report the macro cell power preference and the small cell power preference, the one UE assistance information message to comprise the master PPI IE and the secondary PPI IE.

In Example 99, the wireless communication method of Example 98 may optionally comprise sending the one UE assistance information message to a master evolved node B (MeNB) of a serving macro cell of the UE.

In Example 100, the wireless communication method of Example 97 may optionally comprise sending a first UE assistance information message to report the macro cell power preference, the first UE assistance information message to comprise the master PPI IE, and sending a second UE assistance information message to report the small cell power preference, the second UE assistance information message to comprise the secondary PPI IE.

In Example 101, the wireless communication method of Example 100 may optionally comprise sending the first UE assistance information message to a master evolved node B (MeNB) of a serving macro cell of the UE.

In Example 102, the wireless communication method of Example 101 may optionally comprise sending the second UE assistance information message to the MeNB.

In Example 103, the wireless communication method of Example 101 may optionally comprise sending the second UE assistance information message to a secondary evolved node B (SeNB) of a serving small cell of the UE.

In Example 104, the wireless communication method of any of Examples 96 to 103 may optionally comprise receiving macro cell discontinuous reception (DRX) settings and small cell DRX settings in response to the one or more UE assistance information messages.

In Example 105, the wireless communication method of Example 104 may optionally comprise sending at least one of the one or more UE assistance information messages to a master evolved node B (MeNB) of a serving macro cell of the UE, and receiving the macro cell DRX settings and the small cell DRX settings from the MeNB.

In Example 106, the wireless communication method of any of Examples 104 to 105 may optionally comprise monitoring one or more control channels of a macro cell in accordance with the macro cell DRX settings.

In Example 107, the wireless communication method of any of Examples 104 to 106 may optionally comprise monitoring one or more control channels of a small cell in accordance with the small cell DRX settings.

Example 108 is at least one non-transitory computer-readable storage medium comprising a set of instructions that, in response to being executed on a computing device, cause the computing device to perform a wireless communication method according to any of Examples 96 to 107.

Example 109 is an apparatus, comprising means for performing a wireless communication method according to any of Examples 96 to 107.

Example 110 is a system, comprising an apparatus according to Example 109, at least one radio frequency (RF) transceiver, and at least on RF antenna.

In Example 111, the system of Example 110 may optionally comprise a touchscreen display.

Example 112 is a master evolved node B (MeNB), comprising logic, at least a portion of which is in hardware, the logic to select macro cell discontinuous reception (DRX) settings for a user equipment (UE), receive a message comprising small cell DRX settings for the UE, send a first radio resource control (RRC) configuration message comprising the macro cell DRX settings, and send a second RRC configuration message comprising the small cell DRX settings.

In Example 113, the logic of Example 112 may optionally receive a UE assistance information message indicating a macro cell power preference of the UE and select the macro cell DRX settings for the UE based on the macro cell power preference.

In Example 114, the UE assistance information message of Example 113 may optionally comprise a master power preference indication (PPI) information element (IE) that indicates the macro cell power preference.

In Example 115, the logic of any of Examples 113 to 114 may optionally send an RRC message to enable UE assistance information reporting for the UE and receive the UE assistance information message in response to the RRC message.

In Example 116, the logic of Example 115 may optionally receive an indication of a small cell power preference of the UE in response to the RRC message.

In Example 117, the UE assistance information message of Example 116 may optionally comprise the indication of the small cell power preference.

In Example 118, the UE assistance information message of Example 117 may optionally comprise a secondary power preference indication (PPI) information element (IE) that indicates the small cell power preference.

In Example 119, the logic of Example 116 may optionally receive a second UE assistance information message that comprises the indication of the small cell power preference in response to the RRC message.

In Example 120, the logic of any of Examples 116 to 119 may optionally report the small cell power preference to a secondary evolved node B (SeNB) of a serving small cell of the UE.

In Example 121, the logic of Example 120 may optionally report the small cell power preference to the SeNB by sending a message over an X2 interface connection.

In Example 122, the X2 interface connection of Example 121 may optionally be implemented using a non-ideal backhaul.

In Example 123, the logic of any of Examples 120 to 122 may optionally receive the message comprising the small cell DRX settings in response to reporting the small cell power preference to the SeNB.

In Example 124, the logic of any of Examples 112 to 123 may optionally configure one or more transmissions over one or more macro cell control channels in accordance with the macro cell DRX settings.

In Example 125, the MeNB of any of Examples 112 to 124 may optionally comprise at least one radio frequency (RF) transceiver and at least one RF antenna.

In Example 126, the MeNB of Example 125 may optionally comprise at least one memory unit.

Example 127 is a wireless communication apparatus, comprising means for receiving, at user equipment (UE), a radio resource control (RRC) configuration message during operation in a dually-connected UE state, means for determining whether UE assistance information reporting is enabled for the UE based on the RRC configuration message, and means for sending one or more UE assistance information messages to report a macro cell power preference and a small cell power preference in response to a determination that UE assistance information reporting is enabled for the UE.

In Example 128, the one or more UE assistance information messages of Example 127 may optionally collectively comprise a master power preference indication (PPI) information element (IE) to indicate the macro cell power preference and a secondary PPI IE to indicate the small cell power preference.

In Example 129, the wireless communication apparatus of Example 128 may optionally comprise means for sending one UE assistance information message to report the macro cell power preference and the small cell power preference, the one UE assistance information message to comprise the master PPI IE and the secondary PPI IE.

In Example 130, the wireless communication apparatus of Example 129 may optionally comprise means for sending the one UE assistance information message to a master evolved node B (MeNB) of a serving macro cell of the UE.

In Example 131, the wireless communication apparatus of Example 128 may optionally comprise means for sending a first UE assistance information message to report the macro cell power preference, the first UE assistance information message to comprise the master PPI IE, and means for sending a second UE assistance information message to report the small cell power preference, the second UE assistance information message to comprise the secondary PPI IE.

In Example 132, the wireless communication apparatus of Example 131 may optionally comprise means for sending the first UE assistance information message to a master evolved node B (MeNB) of a serving macro cell of the UE.

In Example 133, the wireless communication apparatus of Example 132 may optionally comprise means for sending the second UE assistance information message to the MeNB.

In Example 134, the wireless communication apparatus of Example 132 may optionally comprise means for sending the second UE assistance information message to a secondary evolved node B (SeNB) of a serving small cell of the UE.

In Example 135, the wireless communication apparatus of any of Examples 127 to 134 may optionally comprise means for receiving macro cell discontinuous reception (DRX) settings and small cell DRX settings in response to the one or more UE assistance information messages.

In Example 136, the wireless communication apparatus of Example 135 may optionally comprise means for sending at least one of the one or more UE assistance information messages to a master evolved node B (MeNB) of a serving macro cell of the UE, and means for receiving the macro cell DRX settings and the small cell DRX settings from the MeNB.

In Example 137, the wireless communication apparatus of any of Examples 135 to 136 may optionally comprise means for monitoring one or more control channels of a macro cell in accordance with the macro cell DRX settings.

In Example 138, the wireless communication apparatus of any of Examples 135 to 137 may optionally comprise means for monitoring one or more control channels of a small cell in accordance with the small cell DRX settings.

Example 139 is a system, comprising a wireless communication apparatus according to any of Examples 127 to 138, at least one radio frequency (RF) transceiver, and at least one RF antenna.

In Example 140, the system of Example 139 may optionally comprise a touchscreen display.

Example 141 is a wireless communication method, comprising selecting, by a processor circuit at a master evolved node B (MeNB), macro cell discontinuous reception (DRX) settings for a user equipment (UE), receiving a message comprising small cell DRX settings for the UE, sending a first radio resource control (RRC) configuration message comprising the macro cell DRX settings, and sending a second RRC configuration message comprising the small cell DRX settings.

In Example 142, the wireless communication method of Example 141 may optionally comprise receiving a UE assistance information message indicating a macro cell power preference of the UE, and selecting the macro cell DRX settings for the UE based on the macro cell power preference.

In Example 143, the UE assistance information message of Example 142 may optionally comprise a master power preference indication (PPI) information element (IE) that indicates the macro cell power preference.

In Example 144, the wireless communication method of any of Examples 142 to 143 may optionally comprise sending an RRC message to enable UE assistance information reporting for the UE and receiving the UE assistance information message in response to the RRC message.

In Example 145, the wireless communication method of Example 144 may optionally comprise receiving an indication of a small cell power preference of the UE in response to the RRC message.

In Example 146, the UE assistance information message of Example 145 may optionally comprise the indication of the small cell power preference.

In Example 147, the UE assistance information message of Example 146 may optionally comprise a secondary power preference indication (PPI) information element (IE) that indicates the small cell power preference.

In Example 148, the wireless communication method of Example 145 may optionally comprise receiving a second UE assistance information message that comprises the indication of the small cell power preference in response to the RRC message.

In Example 149, the wireless communication method of any of Examples 145 to 148 may optionally comprise reporting the small cell power preference to a secondary evolved node B (SeNB) of a serving small cell of the UE.

In Example 150, the wireless communication method of Example 149 may optionally comprise reporting the small cell power preference to the SeNB by sending a message over an X2 interface connection.

In Example 151, the X2 interface connection of Example 150 may optionally be implemented using a non-ideal backhaul.

In Example 152, the wireless communication method of any of Examples 149 to 151 may optionally comprise receiving the message comprising the small cell DRX settings in response to reporting the small cell power preference to the SeNB.

In Example 153, the wireless communication method of any of Examples 141 to 152 may optionally comprise configuring one or more transmissions over one or more macro cell control channels in accordance with the macro cell DRX settings.

Example 154 is at least one non-transitory computer-readable storage medium comprising a set of instructions that, in response to being executed on a computing device, cause the computing device to perform a wireless communication method according to any of Examples 141 to 153.

Example 155 is an apparatus, comprising means for performing a wireless communication method according to any of Examples 141 to 153.

Example 156 is a system, comprising an apparatus according to Example 155, at least one radio frequency (RF) transceiver, and at least on RF antenna.

In Example 157, the system of Example 156 may optionally comprise at least one memory unit.

Example 158 is at least one non-transitory computer-readable storage medium comprising a set of wireless communication instructions that, in response to being executed at a secondary evolved node B (SeNB), cause the SeNB to receive an indication of a small cell power preference of a user equipment (UE), select small cell discontinuous reception (DRX) settings for the UE based on the small cell power preference, and send a radio resource control (RRC) message to report the selected small cell DRX settings.

In Example 159, the at least one non-transitory computer-readable storage medium of Example 158 may optionally comprise wireless communication instructions that, in response to being executed at the SeNB, cause the SeNB to receive a message comprising the indication of the small cell power preference over an X2 interface connection.

In Example 160, the X2 interface connection of Example 159 may optionally be implemented using a non-ideal backhaul.

In Example 161, the at least one non-transitory computer-readable storage medium of any of Examples 159 to 160 may optionally comprise wireless communication instructions that, in response to being executed at the SeNB, cause the SeNB to send the RRC message over the X2 interface connection.

In Example 162, the at least one non-transitory computer-readable storage medium of any of Examples 159 to 161 may optionally comprise wireless communication instructions that, in response to being executed at the SeNB, cause the SeNB to receive the message comprising the indication of the small cell power preference from a master evolved node B (MeNB) of a serving macro cell of the UE.

In Example 163, the received message of any of Examples 159 to 162 may optionally comprise a power preference indication (PPI) information element (IE) that indicates the small cell power preference.

In Example 164, the at least one non-transitory computer-readable storage medium of Example 158 may optionally comprise wireless communication instructions that, in response to being executed at the SeNB, cause the SeNB to receive a UE assistance information message comprising the indication of the small cell power preference.

In Example 165, the UE assistance information message of Example 164 may optionally comprise a power preference indication (PPI) information element (IE) that indicates the small cell power preference.

In Example 166, the at least one non-transitory computer-readable storage medium of Example 165 may optionally comprise wireless communication instructions that, in response to being executed at the SeNB, cause the SeNB to receive the UE assistance information message from the UE.

In Example 167, the at least one non-transitory computer-readable storage medium of any of Examples 158 to 166 may optionally comprise wireless communication instructions that, in response to being executed at the SeNB, cause the SeNB to send the RRC message to a master evolved node B (MeNB) of a serving macro cell of the UE.

In Example 168, the at least one non-transitory computer-readable storage medium of any of Examples 158 to 167 may optionally comprise wireless communication instructions that, in response to being executed at the SeNB, cause the SeNB to configure at least one transmission over at least one small cell control channel based on the small cell DRX settings.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. User equipment (UE), comprising:
 a display; and
 logic, at least a portion of which is in hardware, the logic to:
  receive a radio resource control (RRC) configuration message during operation in a dually-connected UE state;
  determine whether UE assistance information reporting is enabled for the UE based on the RRC configuration message; and
  in response to a determination that UE assistance information reporting is enabled for the UE, send one or more UE assistance information messages to report a macro cell power preference and a small cell power preference, the one or more UE assistance information messages to collectively comprise a master power preference indication (PPI) information element (IE) to indicate the macro cell power preference and a secondary PPI IE to indicate the small cell power preference.

2. The UE of claim 1, the logic to send one UE assistance information message to report the macro cell power preference and the small cell power preference, the one UE assistance information message to comprise the master PPI IE and the secondary PPI IE.

3. The UE of claim 2, the logic to send the one UE assistance information message to a master evolved node B (MeNB) of a serving macro cell of the UE.

4. The UE of claim 1, the logic to send a first UE assistance information message to report the macro cell power preference and send a second UE assistance information message to report the small cell power preference, the first UE assistance information message to comprise the master PPI IE, the second UE assistance information message to comprise the secondary PPI IE.

5. The UE of claim 4, the logic to send the first UE assistance information message and the second UE assistance information message to a master evolved node B (MeNB) of a serving macro cell of the UE.

6. The UE of claim 4, the logic to send the first UE assistance information message to a master evolved node B (MeNB) of a serving macro cell of the UE and send the second UE assistance information message to a secondary evolved node B (SeNB) of a serving small cell of the UE.

7. The UE of claim 1, the logic to receive macro cell discontinuous reception (DRX) settings and small cell DRX settings in response to the one or more UE assistance information messages.

8. The UE of claim 1, comprising:
at least one radio frequency (RF) transceiver; and
at least one RF antenna.

9. A master evolved node B (MeNB), comprising:
at least one memory unit; and
logic, at least a portion of which is in hardware, the logic to:
receive a user equipment (UE) assistance information message comprising:
a master power preference indication (PPI) information element (IE) that indicates a macro cell power preference of a UE; and
a secondary PPI IE that indicates a small cell power preference of the UE;
select macro cell discontinuous reception (DRX) settings for the UE;
receive a radio resource control (RRC) message from a secondary evolved node B (SeNB) of a serving small cell of the UE, the RRC message comprising small cell DRX settings for the UE;
send a first RRC configuration message comprising the macro cell DRX settings; and
send a second RRC configuration message comprising the small cell DRX settings.

10. The MeNB of claim 9, the logic to select the macro cell DRX settings for the UE based on the macro cell power preference.

11. The MeNB of claim 9, the logic to send an RRC message to enable UE assistance information reporting for the UE and receive the UE assistance information message in response to the RRC message.

12. The MeNB of claim 9, the logic to send a message over an X2 interface connection to report the small cell power preference to the SeNB.

13. The MeNB of claim 9, comprising:
one or more radio frequency (RF) transceivers; and
one or more RF antennas.

* * * * *